United States Patent

Oldham, III

[15] 3,668,632

[45] June 6, 1972

[54] FAST DECODE CHARACTER ERROR DETECTION AND CORRECTION SYSTEM

[72] Inventor: Ira B. Oldham, III, Saratoga, Calif.

[73] Assignee: International Business Machines Corporation, Armonk, N.Y.

[22] Filed: Feb. 13, 1969

[21] Appl. No.: 798,976

[52] U.S. Cl. ....................340/146.1

[51] Int. Cl. ....................H04l 1/10

[58] Field of Search ....................340/146.1

[56] References Cited

UNITED STATES PATENTS

| | | | |
|---|---|---|---|
| 3,278,729 | 10/1966 | Chien | 340/146.1 X |
| 3,398,400 | 8/1968 | Rupp et al. | 340/146.1 |
| 3,418,629 | 12/1968 | Chien | 340/146.1 |
| 3,491,338 | 1/1970 | Malloy | 340/146.1 |

*Primary Examiner*—Malcolm A. Morrison
*Assistant Examiner*—R. Stephen Dildine, Jr.
*Attorney*—Peter R. Leal and Hanifin & Jancin

[57] ABSTRACT

Apparatus for detecting and correcting errors in a digital computer storage system is disclosed. Data is encoded using a generalized Reed-Solomon encoder. Error detection circuitry including power sum calculating devices are used for detection of data in error. The error correction portion of the invention includes an improved decoding scheme for determining the location and magnitudes of errors within the data and has a very low average correction time. Means are provided for determining the starting area of a data block in the presence of errors in the starting area. Further means are provided for detecting a cyclic shift in a data character which, under normal conditions, would appear as an acceptable code word even though in error.

14 Claims, 25 Drawing Figures

INVENTOR
IRA B. OLDHAM III
BY Peter R. Leal
ATTORNEY

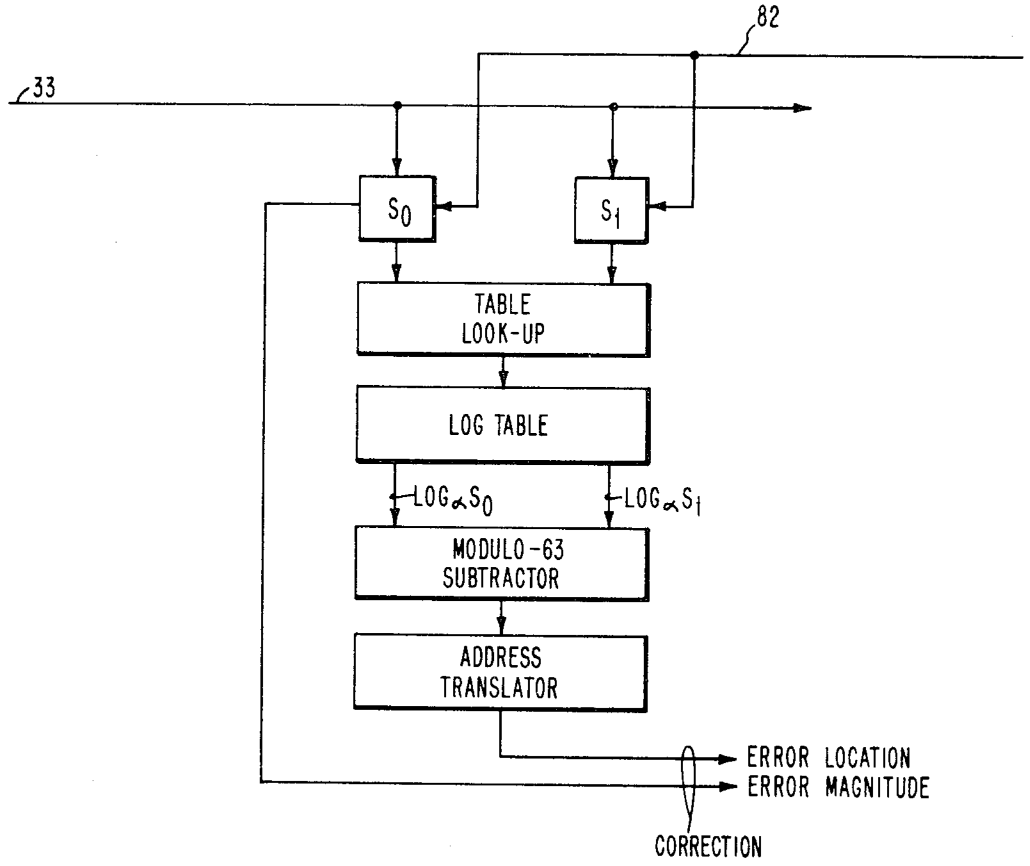
FIG. 8A-A
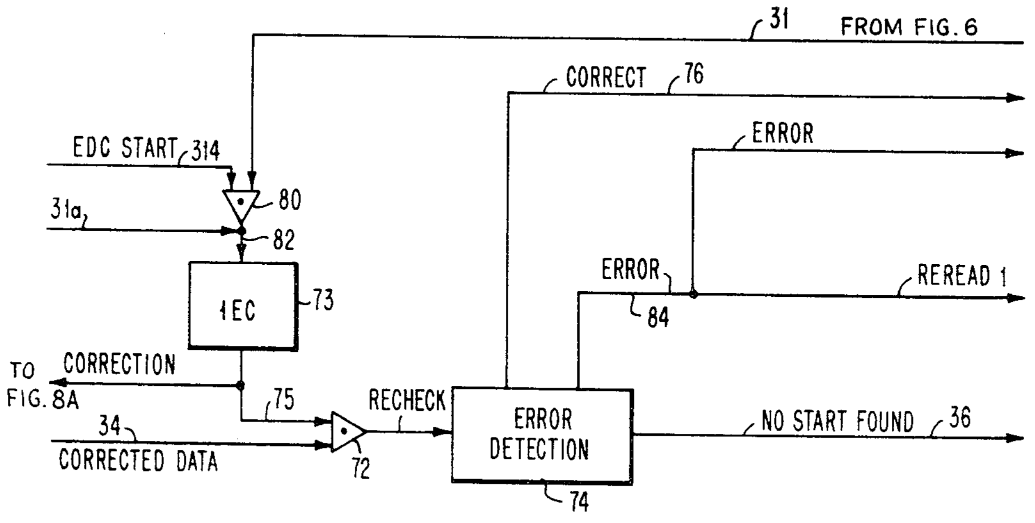
FIG. 8B-A

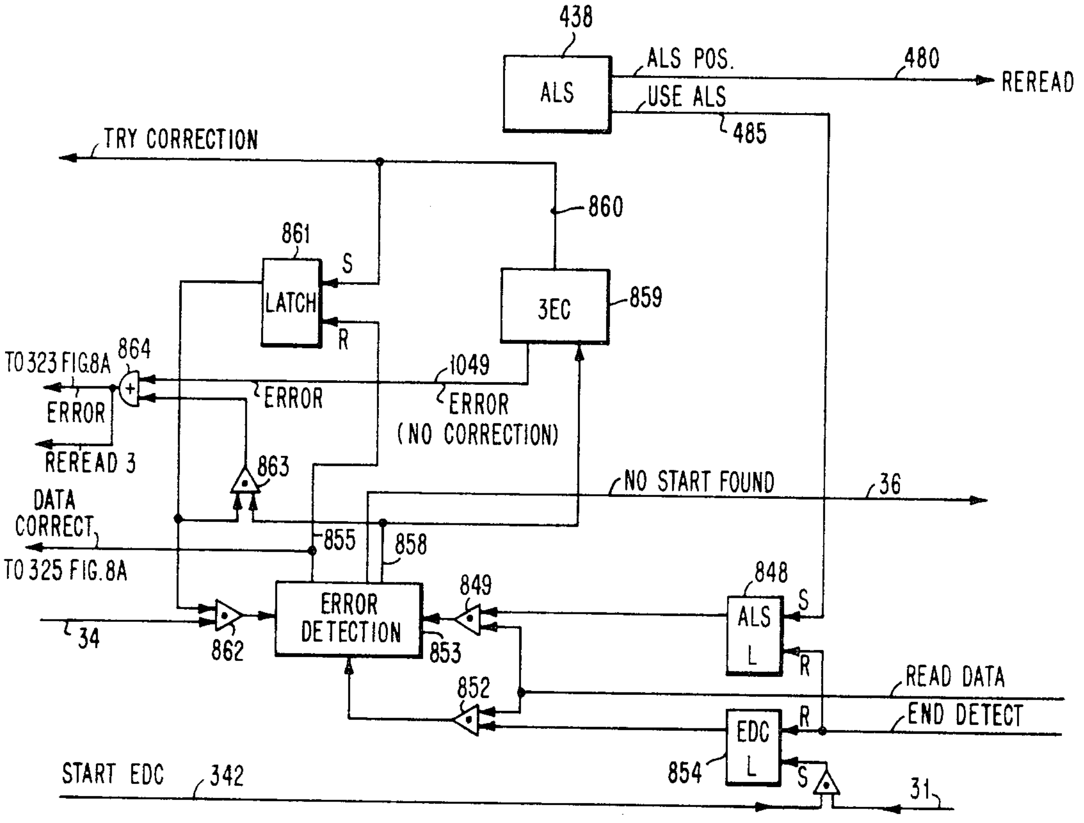
FIG. 8B-B
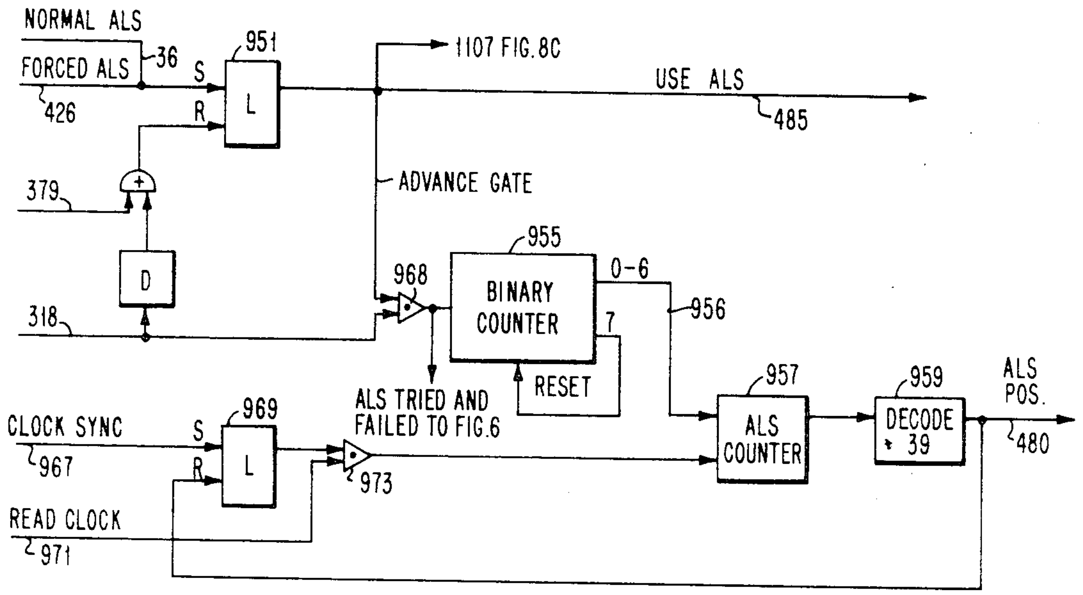
FIG. 8C-A

FAST DECODE CHARACTER ERROR DETECTION AND CORRECTION SYSTEM

RELATED APPLICATIONS

This application is related to application serial number 798,975 filed Feb. 13, 1969, and assigned to the common assignee.

BACKGROUND OF THE INVENTION

1. Field of the Invention

This invention relates to apparatus for the detection and correction of errors in a digital computer storage system.

2. Description of Prior Art

The complexities of modern life have generated the need for the electronic processing of vast amounts of data. This need has triggered the development of large-scale, fast electronic digital computers which have on line large amounts of bulk or mass storage. Data is processed and then stored in mass storage to be retrieved as needed. During the storage and retrieval of this data, data error rates are sometimes encountered which, depending upon the system involved, can be high and, in fact, intolerable.

In the past, simple error detection and correction systems have been built to correct errors generated in the storage and retrieval of data. However, these systems cannot perform powerful error correction procedures. For example, they can correct a small number of independent single bit errors or can correct a number of bits which are all in one burst, but cannot correct multiple bursts as the Reed-Solomon type codes can. Also although Reed-Solomon codes theoretically could be implemented, such implementation would take an inordinately long period of time for correction in any practical system. Further, these systems have suffered from the inability to overcome problems involved with loss of synchronization in data clocking. Furthermore, in prior art systems using cyclic codes, a cyclic shift of a character would result in an incorrect character which would appear to the system to be correct. This is because a cyclic shift of a code appears to be a correct code, and therefore and error could go undetected.

Accordingly, it is the general object of this invention to provide a new and improved system for error detection and correction.

A more particular object of this invention is to provide a system for error detection and correction which has a fast average correction time.

Still another object of this invention is to provide an error detection and correction system which can detect a cyclic character shift.

It is yet another object of this invention to provide a new and improved decoding scheme in an error detection and correction system.

It is still another objective of this invention to provide a new and improved scheme with direct correction of double errors.

SUMMARY OF THE INVENTION

A new and improved error detection and correction system for use in a digital computer storage system is disclosed. A generalized Reed-Solomon encoder is used for encoding redundancy to be appended to blocks of data. The encoder also includes means for inverting certain bits within the redundancy to enable one to detect, and therefore correct, cyclic shifts within a data character. Data is then formatted, including the appending of a data block start pattern which allows the detection of the start of a data block by majority logic, even in the presence of a number of errors at the beginning of the data block. Data is written on a storage medium, the type of which may vary according to the requirements of a storage system. As the data is read from the storage system, the start pattern is detected and a given data block is sent to power sum calculators to determine the presence or absence of an error. Apparatus is also provided for detecting the identifier of a given data block to insure that the desired block of data is being read and detected. If errors are detected in the data, attempts are made to correct those errors by means of scheduling apparatus which allows the performance of optimized error recovery procedures.

BRIEF DESCRIPTION OF THE DRAWINGS

FIG. 8A-A is a representation of the apparatus for performing single error correction.

FIG. 8A-B is a representation of the single error correction portion of the 1 EDC facility of the invention.

FIG. 8B-A is a representation of the EDC facility of our invention.

FIG. 8B-B is an example of the 3 EDC facility of our invention.

FIG. 8C-A is a representation of part of the parameter variation apparatus of our invention.

DESCRIPTION OF PREFERRED EMBODIMENT

STRUCTURE

Figure 1:
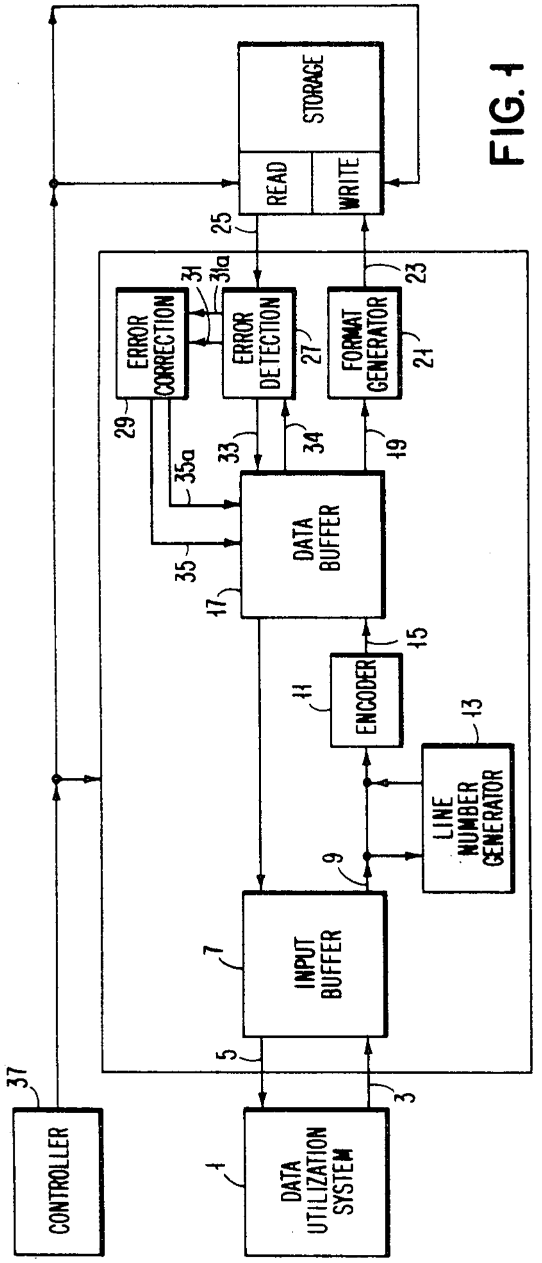
FIG. 1 is a representation of the error detection and correction system of the present example embodied in a generalized digital computer storage system.

The structure of one embodiment of the invention is seen generally in FIG. 1. In that figure, a data utilization system 1, which may be, for example, a digital computer, is connected via Buses 3 and 5 to input buffer 7. Input buffer 7 is connected via line 9 to encoder 11. Line number generator 13 is also provided. Encoder 11 is connected via bus 15 to data buffer 17. Bus 19 connects data buffer 17 to format generator 21. The storage system, including a write and a read facility, is connected to format generator 21 by Bus 23 which is an input to the write facility of the storage system. The read facility of the storage system is connected via Bus 25 to error detection facility 27 which is connected to error correction facility 29 via lines 31 and 31*a* and also to data buffer 17 via Busses 33 and 34. Error correction facility 29 is connected to data buffer 17 by Bus 35. Also provided is controller 37 which controls and sequences operation within the system.

It is to be emphasized that the various features of the invention can be applied to many different types of storage systems.

One type storage system to which it can be applied is a photo-digital storage system described generally in the article, "Dynamic Recovery Techniques Guarantee System Reliability," by D. P. Gustlin and D. D. Prentice, 1968, AFIPS Conference Proceedings, Vol. 33, Part 2, pages 1,389 – 1,397. In that system, data is stored by high-density recording in two dimensions on silver-halide photographic film chips, a number of chips being stored in a container or cell. The cells are brought to the reader under automatic control in response to main processor commands. Writing is accomplished with an electron beam and reading with a cathode ray flying-spot scanner. An electron beam recorder suitable for use in such a system can be found in the paper, "An Electron-Beam System For Digital Recording," by K. H. Loeffler, IEEE 9th Annual Symposium on the Electron Ion and Laser Beam Technology, May 1967.

Another pertinent reference on a photo-digital storage system in which the invention could find use is the paper "A Photo-Digital Mass Storage System", by J. D. Kuehler and H. R. Kerby, Proc. F.J.C.C., 1966, Page 753.

Figure 2:
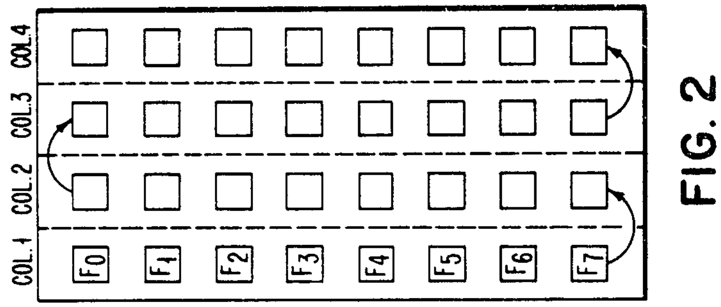
FIG. 2 is a representation of one storage medium to which the system of the present invention can be applied.
Figure 2A:
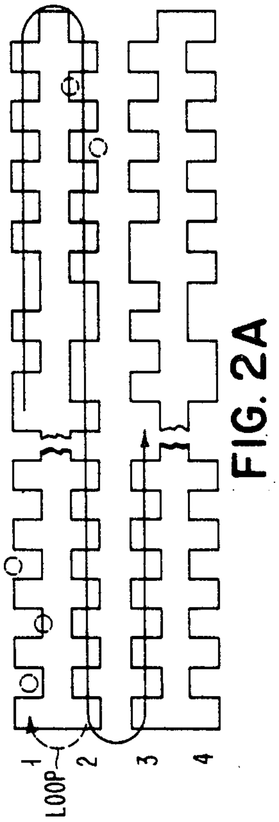
FIG. 2A is an illustration of how data can be recorded on the medium of FIG. 2.

With reference now to FIG. 2, there is seen the layout of a photographic film chip which would be used if the present invention were embodied in a photo-digital system such as the one described in the above-cited publications. Each square, reading downwardly in a given column, is a frame. There are eight frames per column, $F_0F_1$–$F_7$ and 492 data blocks called data lines. With reference to FIG. 2A, there is seen a representation of the manner in which data can be recorded on the photographic chip of FIG. 2. The digital code depicted in FIG. 2A uses two marks, one clear and one opaque, to represent one binary bit. A combination of one clear and one opaque spot corresponds to a binary zero; and its opposite, an opaque followed by a clear, represents a binary one. Lines are recorded in pairs, for example, the pairs 1,2 and 3,4 on FIG. 2A. Reading, utilizing a recording system such as that described in the paper by Loeffler, cited above, proceeds in the fashion indicated by the arrow in FIG. 2A. The manner in which the line turns are performed and the manner of tracking and line switching are described in detail in the patent application entitled "Photographic Information Storage Optical Tracking and Switching System," Ser. Number 509,080, filed Nov. 22, 1965, now U.S. Pat. No. 3,480,919, and assigned to the assignee of the present invention.

Figures 2B, 2C:
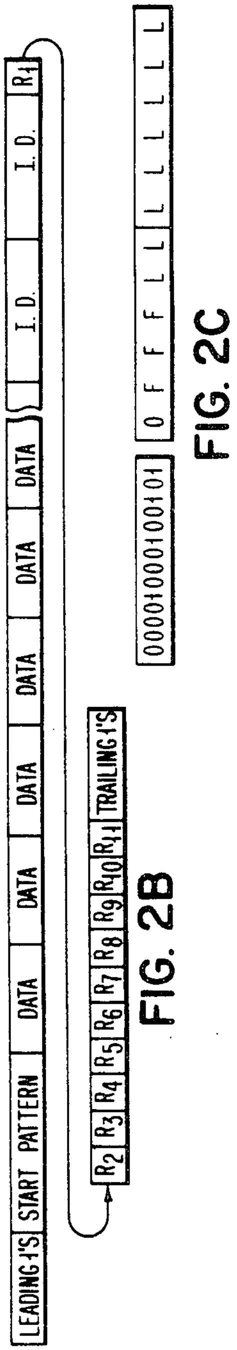
FIG. 2B is an illustration of one manner of how data can be formatted for use in the invention.
FIG. 2C is an illustration of one way in which the identifier fields and start pattern of the data format of FIG. 2B can be configured.

Referring now to FIG. 2B, there is seen one manner in which a data block may be encoded for use in the invention. As seen in that figure, each data block has a number of leading 1's for clock synchronization. A start pattern is appended thereafter. Fifty six-bit data characters are thereafter appended, followed by two identification characters. After the identification characters eleven six-bit redundancy characters, $R_1$ through $R_{11}$, are appended by the encoder and are followed by a number of trailing 1's. This totals 63 six-bit characters per data block, exclusive of start patterns and leading and trailing 1's.

Seen in FIG. 2C is the start pattern and the two identifier fields in the data format of FIG. 2B. It is seen that the start pattern is in the form 00001000100101. For a preceding pattern for all 1's, it can be shown that there is a minimum Hamming distance of 7 between this starting pattern and any correct preceding pattern of all 1's.

Similarly, the pattern 00101 has a minimal Hamming distance of 3, the pattern 000100101 has a minimal Hamming distance of 5, etc.

Also seen in FIG. 2C are the identifier characters. The three F bits indicate the frame number of a given column, while all the eight L bits designate the desired line pair within a frame.

ERROR ENCODING

The invention uses a powerful independent character error detection and correction coding technique. To facilitate this, information bits in each line are arbitrarily divided into six-bit characters. The code employed can correct errors in any five characters in a line of 378 bits. Further, it will detect almost all lines with more than five characters in error.

The code used is a generalized Reed-Solomon 11-character redundancy code over the Galois field ($2^6$). Using this code, the 52 information characters in a line are used to calculate 11 redundancy characters which are appended for a total of 378 bits in the encoded line. Fifty of the information characters are data; the other two contain a line identification number. In addition to the 378 encoded bits, there are 42 other bits used for line header, line start pattern and line trailer.

The appropriate redundancy characters are produced prior to recording and appended to the line. The characters in a line are treated as coefficients of a polynomial with the first character understood as the coefficient of $x^{62}$, the second of $x^{61}$,–the 52nd of $x^{11}$ (which is the last information character). The coefficients of $x^{10}$ through $x^0$ are zero before encoding and will contain the redundancy characters when the line has been encoded. The redundancy character generator divides this "data polynomial" by a generator polynomial. The remainder obtained is subtracted from the data polynomial to produce a "coded line polynomial" which is, therefore, divisible by the generator polynomial with a zero remainder.

The generator polynomial is:

$$\prod_{i=-5}^{5} (x-\alpha^i)$$

where $\alpha$ is a primitive root of the polynomial $x^6+x+1$ which generates the Galois Field ($2^6$) from the Galois Field (2). A coded line polynomial is divisible by each of the 11 factors of the generator polynomial; thus, the coded line polynomial is zero when $x=\alpha^i$ for $-5 \leq i \leq +5$.

When a line is read, it is checked in the following manner. Eleven check sum calculating circuits substitute the eleven values $x=\alpha^i$ for $-5 \leq i \leq +5$ into the coded line polynomial. If all 11 check sums are zero, the line is considered correct; otherwise, there is an error and the eleven check sums can be used by error correction means to try to correct the errors.

When five or fewer characters are in error, the check sums are not zero. The magnitude and location of the errors can be calculated from these sums. The magnitude is that pattern of bits in error in a character. The location indicates the character in the line in which the bits should be changed. When there are six or more characters in error, it is impossible to solve correctly for the locations and magnitudes. In this case, the errors can usually be detected but can never be corrected.

The principle involved in correction can briefly be explained as follows:

If there is a single character error, the line polynomial would be:

$$a_{62}x^{62}+a_{61}x^{61}+\ldots+(a_L+Y)x^L+\ldots+a_0x$$

where the $a_i$, for $62 \geq i \geq 0$, are the correct data; $Y$ is the magnitude of the error; and L is the power of $x$ at the error location. This polynomial is the same as the error-free polynomial with the exception of the added term $Yx^L$.

The check sums for the correct line would all be zero if there were no error. With the error they are $S_i=X^{iL}Y$ because only the error causes them to be non-zero. One special case is:

$$S_0=Y\alpha^{0L}=Y\alpha^0=Y \quad (1)$$

Therefore, in the case of a single error, $S_0$ is the magnitude of the error.

The location of the single error is computed using $S_1$.

$$S_1=Y\alpha^{1L} \quad (2)$$

$$S_1/S_0=Y\alpha^L/Y=\alpha^L$$

$$L=\text{Log}_\alpha S_1/S_0 \quad (3)$$

The computations use logarithms with the base $\alpha$, so the equation manipulated is:

$$L=(\text{Log}_\alpha S_1-\text{Log}_\alpha S_0) \text{ Mod } 63 \quad (4)$$

New and improved decoding apparatus allow correction of more than one error by the solution of simultaneous equations. Each additional error provides two more unknowns: the magnitude and the location. Thus, two additional check sums are required for each additional error. Five errors can be found from ten check sums. The eleventh check sum is provided to help detect the presence of other errors, which are not correctable.

In the error correction process, a strategy is employed which minimizes the average amount of time spent in error correction. In a series of steps, single error correction can be tried, followed by rereading and double error correction, and so forth, up to five-character error correction. Single-character error correction is very fast. Therefore, single-character error correction can be tried many times along with subsequent rereads in less total time than going to the next level of correction. Furthermore, most lines in error have only a single character error. The correction process proceeds up an hierarchy of error correction levels and other read recovery functions before giving up on a line.

Addition, Subtraction, and Multiplication by a Constant in the Galois Field ($2^6$)

We will use six-bit characters. If we are to use six-bit characters only, we must use an arithmetic which operates with six-bit characters only. It would not do to use an arithmetic in which the sum of two six-bit characters is a seven-bit character.

An arithmetic which uses only six-bit characters is arithmetic in the Galois field ($2^6$). We can define this arithmetic in an arbitrary manner and then look at the addition and multiplication tables to verify that it works.

*Characters.* All six-bit patterns are characters in GF ($2^6$). There are 64 in all. For convenience we will call some of them by special names as follows:

000000 is called zero (or 0)

000001 is called the unity element 000010 is called $\alpha$, the primitive element This is a positional notation; that is, the position as well as the number of "1's" affects the value of the character.

*Addition.* We wish to define some kind of addition. The operation which we will define as addition is to exclusive-or the corresponding positions of the two characters. Examples:

$$110101 + 101000 = 011101 \quad (1)$$
$$011000 + 100001 = 111001 \quad (2)$$
$$111001 + 100001 = 011000 \quad (3)$$
$$100100 + 000000 = 100100 \quad (4)$$
$$100100 + 100100 = 000000 \quad (5)$$

Subtraction can be defined as the addition of an inverse; but, if each character is its own inverse, this means subtraction is the same as addition, i.e., $b-a=b+a$ or $b+a=c;c+a=b$ (see examples 2 and 3 above. Now we have finite characters, addition, and subtraction.

*Multiplication.* Multiplication will be described piece by piece until we have a complete statement of the rules of multiplication.

1. Multiplication by zero produces zero.
2. Multiplication by the unity element produces no change.
3. Multiplication by $\alpha$, the primitive element, causes a shift left one.

Example:

$$010111 \times 000010 = 101110$$

4. Multiplication which shifts a bit off the left causes it to be carried around and be "added" into the two rightmost positions:

Example:

$$100000 \times 000010 = 000011$$

Note in the last example the bit carried around to the second position "added" to the bit shifted to the second position to produce a zero in the second position.

5. Multiplication by a character which has one "one" bit causes a shift left (and carry around). The number of positions shifted is the same as the number of positions to the right of the "one" bit.

Example:

$$001010 \times 000100 = 101000$$

6. $a(b+c) = ab + ac$ in a field. Using this we can perform multiplication by characters which have more than one "one" bit.

Example:

$$001010 \times 000110 = 111100$$

In the invention we will use logarithms except in the encoder and error sum calculator where we will make the connections to perform the shifting and exclusive-or functions.

Check Bit Generator

Figure 3:
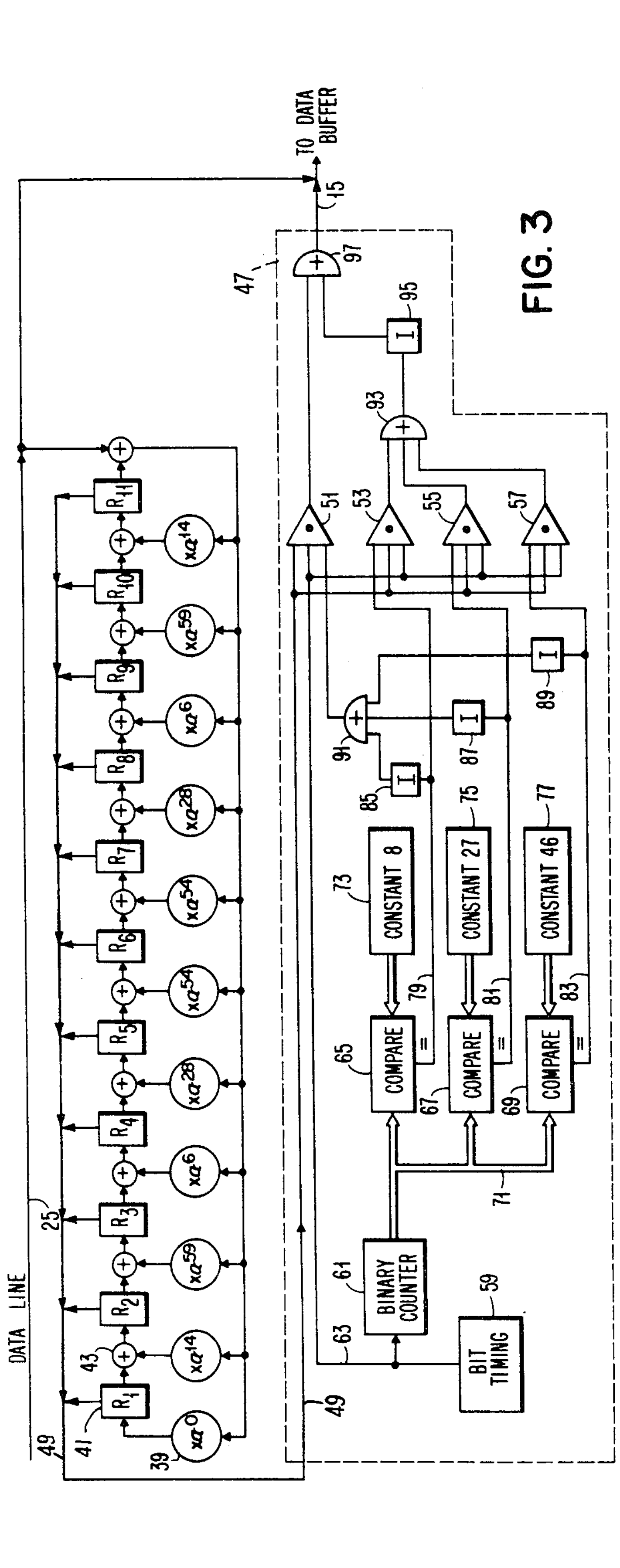
FIG. 3 is a diagram of encoder of the invention.
Figure 4A:
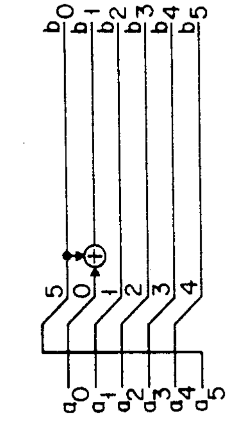
FIGS. 4A – 4D are diagrams of typical Galois field multipliers used in the invention.
Figure 4B:
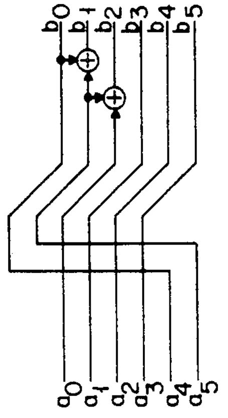
Figure 4C:
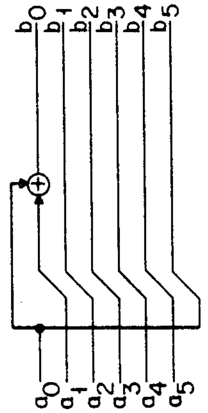
Figure 4D:
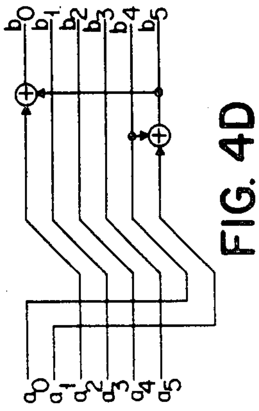

The check bit generator of FIG. 3 comprises 11 storage registers, multipliers to implement division by a fixed division, and exclusive-OR circuits to perform addition in the Galois Field ($2^6$).

Redundancy character generation is similar in principle to polynomial division by a fixed divisor. The data polynomial contains 63 powers of $x$. The original data, positioned into 50 six-bit characters, are the coefficients of the first 50 powers of $x$, ($x^{62}$ to $x^{13}$). The line number field is the coefficient of $x^{12}$ and $x^{11}$ and coefficients of $x^{10}$ to $x^0$ are zero. After division by a fixed divisor, the remainder is stored in the 11 check bit registers, R11 to R1. The contents of these registers are the coefficients of $x^{10}$ to $x^0$ in the encoded data line stored in the device buffer.

The fixed divisor used for redundancy character generator is:

$$P(x)=\alpha^0x^{11}+\alpha^{14}x^{10}+\alpha^{59}x^9+\alpha^6x^8+\alpha^{28}x^7+\alpha^{54}x^6+\alpha^{54}x^5+\alpha^{28}x^4+\alpha^6x^3+\alpha^{59}x^2+\alpha^{14}x^1+\alpha^0x^0.$$

Note that the coefficient of $x^{11}$ is unity, as required by the circuits. There are no inverters because every character is its own inverse in the Galois Field ($2^6$). The memory elements, R1 to R11, store six bits each. All lines are six-bit parallel. The adder consists of exclusive-OR circuits and the multipliers are implemented by combinations of multiplication by powers of $\alpha$, typical examples of which are seen in FIGS. 4A–4D.

With reference to FIG. 3, redundancy characters are generated by partitioning the data into 52 six-bit characters and applying each, in turn, to the half adder 200. The adder exclusive ORs the data and Register 11 contents. Adder output is then multiplied by the indicated powers of $\alpha$ and then applied to each register inputs. Each register input consists of a multiplier output added to the contents of the lower-order register. Input to register 1 is actually the sum of the input data character and register 11 contents because multiplication by $\alpha^0$ is multiplication by unity. After 52 characters have been applied, the registers contain the redundancy characters. These are then transferred to the device buffer to complete the encoded data line.

Cyclic Shift Detector

An undetected error may occur if a line is started six bits late. To protect against this, three errors are introduced prior to writing a line. These same three errors are removed during reading by re-inverting them before the line is tested for error. If the line is started at other than the correct bit time, six errors will occur, the three introduced before writing and three more when reading. This makes the line uncorrectable.

The inverted bits are in three of the redundancy characters and include character 54 bit 2, character 57 bit 3, and character 60 bit 4.

Referring back to FIG. 3, there is seen circuit 47 which enables cyclic character shift detection. After a data block is encoded, the eleven redundancy characters $R_1 - R_{11}$ remain in the registers as indicated. They are then read out over line 49 to circuit 47. This can be done either character by character or in serial, depending upon the designer's choice. Circuit 47 is set up for serial reading of the redundancy character to the buffer after the reading of the data characters to the buffer. It is the function of circuit 47 to invert three bits in the redundancy characters.

Line 49 is connected to AND gates 51, 53, 55, 57. Bit timing is generated by generator 59 which is connected to binary counter 61 and also to the above mentioned AND gates by line 63. Binary counter 61 is connected to comparison means 65, 67, 69 by Bus 71. Constantnumber generators 73, 75, 77 are connected to the respective comparison circuits as shown. Upon equal comparison a signal is emitted over lines 79, 81, 83. These lines are connected respectively to the above mentioned AND gates and also to inversion means 85, 87, and 89. These inversion means are, in turn, connected to OR gate 91 which is connected to AND gate 51. The outputs of AND gates 53, 55, and 57 are connected to OR gate 93, which in turn is connected to inverter 95. Inverter 95 and the output of AND gate 51 are connected to OR gate 97. The output of OR gate 97 is line 15 to data buffer 17 of FIG. 1. Circuit 47 will invert bit 8, 27, and 46 in the redundancy added to the data block. In operation, data enters the encoder of the line 9 and is encoded, proceeds over line 9 to the data buffer over line 15. After encoding, the eleven redundancy characters reside in registers $R_1 - R_{11}$. They are then read out, in the present example serially, over line 49. Each pulse from the bit-timing generator 59 steps binary counter 61 one count. As the seventh bit is read out of the feedback shift register, comparison circuit 65 will activate line 79. The eighth bit coming down line 49 will therefore pass through activated AND gate 53 which has all of its conditions fulfilled at that time. The eighth data bit will pass through OR gate 93 and be inverted in inverter 95 and pass through OR gate 97 onto the data buffer over line 15. If the redundancy bit is not number 8, 26 or 47, that is character 54 bit 2, character 57 bit 3, and character 60 bit 4, respectively, it will then pass through AND gate 51, OR gate 97, and then over line 15 to the data buffer in its noninverted condition. This is so inasmuch as none of lines 79, 81 or 83 will be active thereby causing inverters 85, 87, and 89 to activate AND gate 91, thus fulfilling the third condition to AND gate 51.

Alternatively, the inversion of the above bits can be accomplished by taking them from the off side of the triggers which can comprise the redundancy registers.

Format Generator

Figure 5:
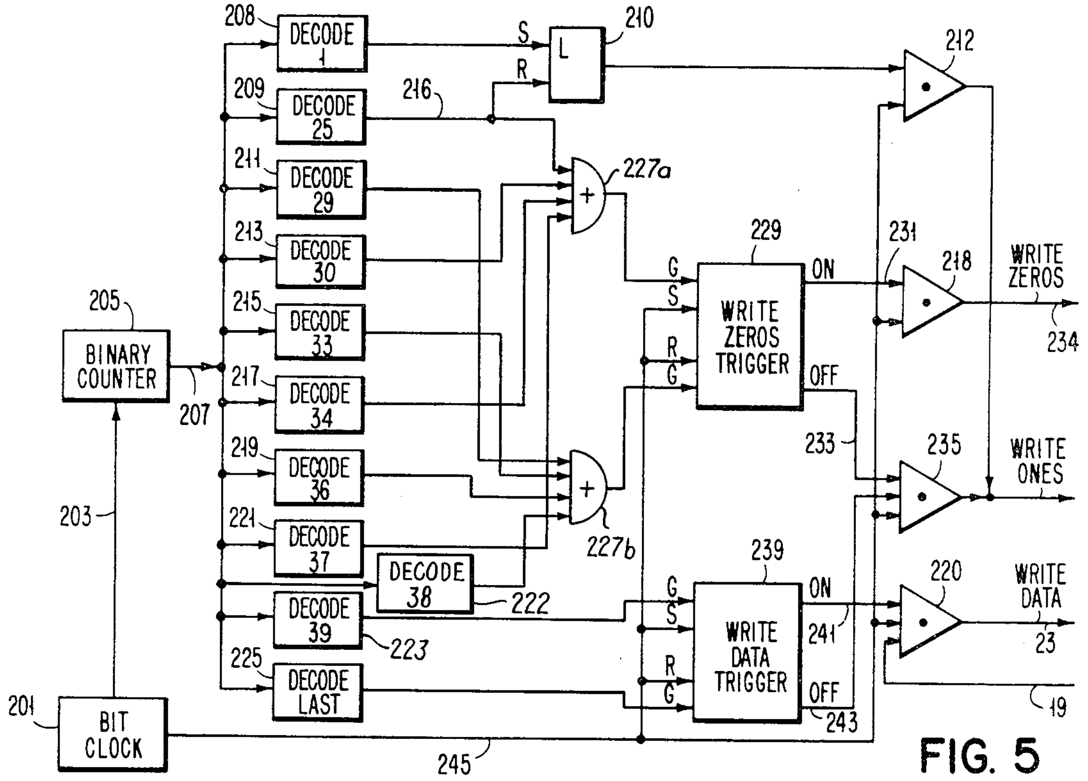
FIG. 5 is a diagram of apparatus for generating the start pattern for a data block.

The format generator seen generally at 21 in FIG. 1 is seen in detail in FIG. 5. It is the function of the format generator to write the start pattern 00001000100101 in the position shown in FIG. 2B. With reference to FIG. 5, there is seen bit clock 201 which is connected by line 203 to binary counter 205. Binary counter 250 is connected by Bus 207 to decoders 208, 209, 211,–,225 Each decoder decodes the binary sequence indicated by the number within the box representative thereof. Each decoder 209 – 221 is connected to OR gate 227, the output of which serves as a gating input to gated write zeroes trigger 229. The on output 231 of trigger 229 conditions AND 218 to allow zeroes to be written on the recording medium, in a manner well-known to those skilled in the art, during the particular bit times under consideration. The off output 233 is connected as an input to AND gate 235. Decoders 223 and 225 are connected to OR gate 237. The output of OR gate 237 serves as gating inputs to the on and off sides of gated write data trigger 239. The ON output 241 of trigger 239 conditions AND 220 to allow data from the data buffer to be written on the recording medium over line 23 in a manner well-known to those skilled in the art, during the bit time under consideration. The off output 243 is connected as an input to AND gate 235. Bit clock 201 is also connected by line 245 as set and reset inputs to both triggers 229 and 239, and also as an input to AND gates 212, 218, 235, 220. Decode 208 sets latch 210 to condition AND 212 to allow the writing of one's during each bit time under consideration.

In operation, when the time comes to write the encoded data from the data buffer onto the storage medium, bit clock 201 is started. Bit clock 201 increments binary counter once each bit time. The output of binary counter 205 is sent over Bus 207 to each of the decoders. On the first bit time, decode 1, 208 sets latch 210 to provide an enabling input to AND gate 212. Timing is such that the first timing pulse from bit clock 201 proceeds over line 245 as the second input to AND GATE 212, thus causing activation of line 214 to write a 1 on the recording medium. It is desirable to write 24 leading 1's to begin a record. Therefore, latch 210 keeps AND gate 212 conditioned to write a 1 once each bit time up to and including the 24th bit time. At bit time 25, Bus 207 is decoded by decoder 209 which resets latch 210, thus deconditioning AND 212. The output of decode 25 on line 216 is transmitted via OR gate 227. Assuming the trigger 229 is initially off, the arrival of a pulse from OR gate 227 concurrently with a 25th bit clock pulse over line 245 acts as a set pulse over line S to turn the write zeroes trigger 229 on, thus enabling a zero to be written by line 234. For the next three clock pulses (pulses 26, 27, and 28), no decode outputs will be enabled; and, therefore, write zeroes trigger 229 will remain on, thus conditioning AND gate 218 during each of those clock pulses to write a zero. Thus, the first four zeroes of the start pattern are written. On clock pulse 29, decoder 211 will cause OR gate **227*b* to condition the off side of write zeroes trigger 229 and as that clock pulse comes along over line 245, it will turn write zeroes trigger 229 off over the reset line R, thus activating line 233. It is assumed that originally write data trigger 239 is off so that line 243 conditions AND gate 235. During this same period, the 29th clock pulse is also conditioning AND gate 235 so that all of its inputs are fulfilled and a one is written on the storage medium. It will be apparent to those skilled in the art that sufficient delay will be necessary in line 245 to insure that each bit clock pulse arrives at AND gates 212, 218, 235** concurrently with the proper enabling signals as described.

Thus far there have been written 24 1's, four zeroes, and a subsequent 1 on the storage medium. On the 30th clock pulse, decode 213 will gate the on side of trigger 229; and the set pulse over line 245 will turn write zeroes trigger on to enable gate 218 so that a zero can be written on a storage medium. AND gate 218 will also be enabled during clock pulses 31 and 32, thus enabling a total of three more zeroes to be written on the storage medium. Thus far, there have been written 24 1's, followed by the pattern 00001000. On bit clock pulse 33, decode 215 will turn off trigger 229 via OR gate **227*b* with the co-action of the clock bit pulse over line 245 acting as a reset pulse. This will activate line 233. Since 243 is already assumed activated, the 33rd bit clock pulse will cause a 1 to be written via AND gate 235. On the 34 th clock pulse decode 217 will enable the on side of trigger 229 which will then be turned on by the 34th clock pulse. This enables a zero to be written during timing period 34 and 35. During clock pulse 36, decode 219 will cause, with the co-action of the 36th bit clock pulse, trigger 229 to be turned off, thus enabling AND gate 235 to write a 1 on the storage medium. Similar action continues with bit clock pulse 37 writing a zero and bit clock pulse 38** writing a 1 on the storage medium in an action similar to that described above.

Thus far there have been written on the storage medium 24 1's followed by the pattern 00001000100101. On the 39th bit clock pulse, decoder 223 via OR gate 237 will condition the on side of write data trigger 239 and the 39th bit clock pulse, via line 245, will set write data trigger 239 to its on condition so that the 39th bit clock pulse and all subsequent bit clock pulses up to the last bit clock pulse for a given data block will cause right data control line 23 to be activated, each bit clock pulse to write bits of the data message of the data block on the storage medium. The last bit clock pulse of a data block will cause decode 225 to condition write data trigger 239 to its off condition so that the last bit clock pulse will turn off the write data trigger.

ERROR DETECTION FACILITY

Figure 6:
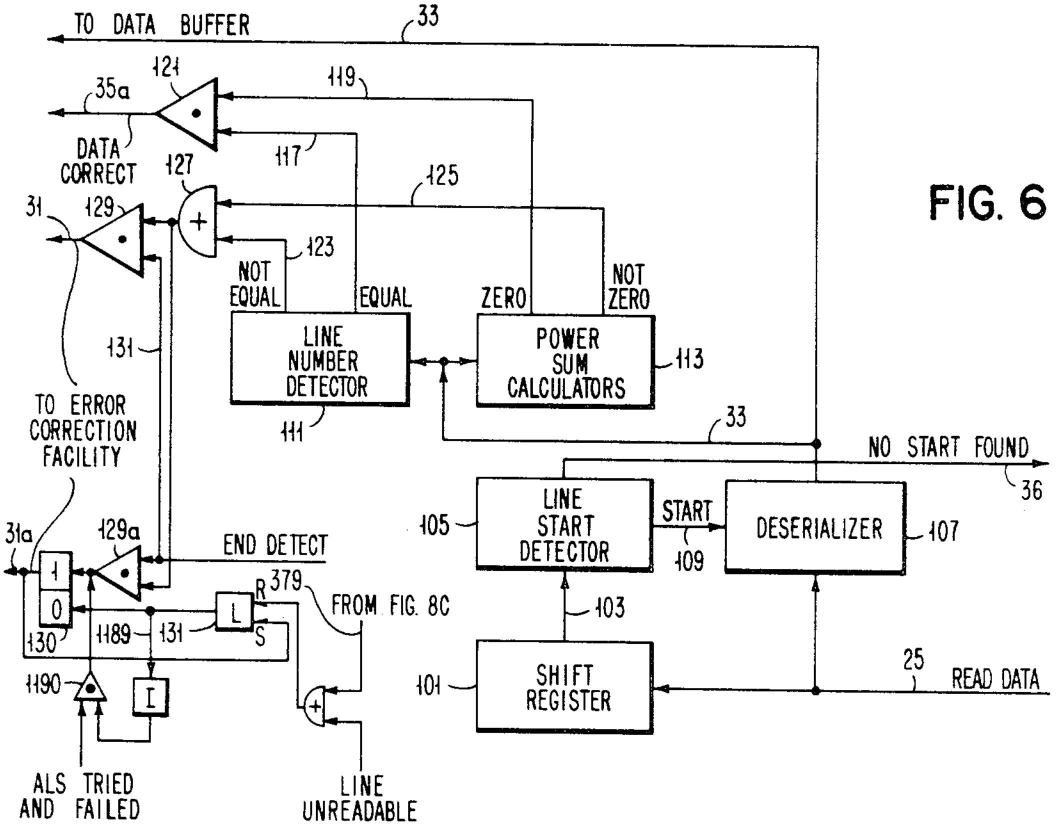
FIG. 6 is a representation of the error detection facility of the invention.

Moving on to FIG. 6, there is seen a diagram of the error detection facility of the invention. Read data enters the error detection facility over line 25, as mentioned previously with regard to FIG. 1. Line 25 is connected to shift register 101 which, in turn, is connected via line 103 to line start detector 105, line 25 also being connected to deserializer 107. Line start detector 105 is connected via line 109 to deserializer 107 which, in turn, is connected via bus 33 to line number detector 111 and power sum calculators 113, and also to data buffer 17 of FIG. 1. Deserializer 107 may be any type well-known in the art. Line number detector 111 and power sum calculators 113 are connected via lines 117 and 119, respectively, to AND gate 121, the output 33a of which serves as an indication to data buffer 17 that the data is correct. The line number detector and power sum calculators are also connected via lines 123 and 125, respectively, to OR gate 127, the output of which forms one input to AND gate 129. The other input to AND gate 129 is line 131, over which a pulse is transmitted when the end of a data block is detected. End detection pulses for data blocks are detected in many ways well-known to those skilled in the art and will not be discussed further here. AND gate 129 is connected via line 31, originally seen with respect to FIG. 1, to the error correction facility.

In operation, read data is transmitted bit by bit to shift register 101 which transmits 14-bit characters over Bus 103 to line start detector 105, which will be described in detail subsequently. When a line start is detected, start line 109 activates deserializer to transmit the data block characters to the line number detector 111, the power sum calculators 113, which will be described in detail subsequently, and to the data buffer via line 33. If the line number is detected as correct and the power sums are all zero, gate 121 will be activated to send a pulse over data correct line 35*a* to the data buffer to indicate that the data block which is read is correct and can then be sent back to the data utilization system. If the line number detector indicates that the line number is in error or if the power sum calculators indicate that the power sum is not zero, AND gate 129 is activated by way of OR gate 127 and end detection pulse over line 131 to send a signal to the error correction facility over line 31 to indicate the error correction procedures must be brought into play to correct the data block which is now in data buffer 17.

Figures 6A, 6B:
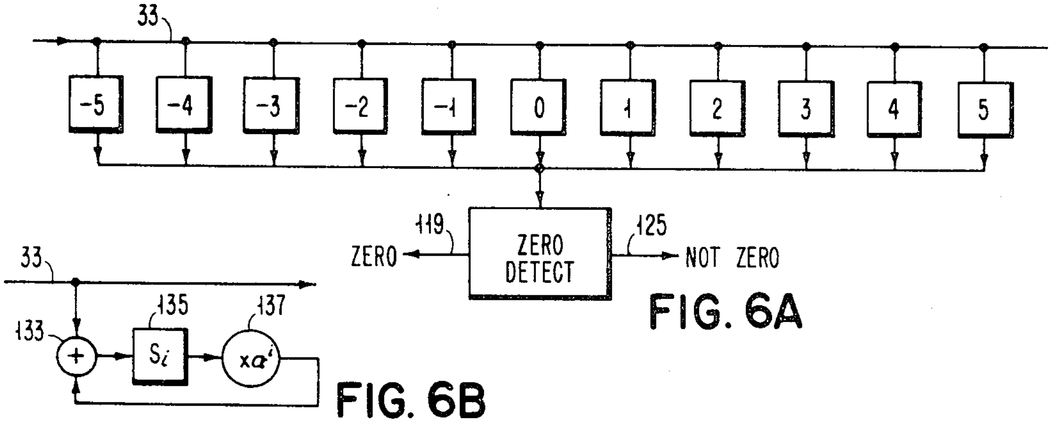
FIG. 6A is a representation of the power sum calculator group used in the invention.
FIG. 6B is a representation of a typical power sum calculator.

Line number detector 111 is merely a comparison unit which compares the identifier characters seen in FIGS. 2C with the desired data line number, and will not be discussed further here. The power sum calculators are seen generally in FIG. 6A. When reading, data progresses along data line 33 and the eleven power sums are calculated. A generalized power sum calculator is seen in FIG. 6B. In that figure, line 33, seen also in FIG. 6A, is connected to exclusive OR gate 133. The exclusive OR gate is connected to a six position register 135 which will hold the power sum after calculation. Register 135 is connected to multiplier 137 which is configured in the same manner as the multipliers seen originally in FIGS. 4A–4D. The coefficients –5 to +5 are individually used for the literal *i* for the power sum calculators. Multiplier 137 is connected back to exclusive OR gate 133.

Line Start Detector

Because of the nature of the start pattern, the line start detector detects the line start pattern if 11 or more of the 14 bits of the line start pattern are correct. The pattern sought for is 00001000100101. It will be recalled from FIG. 6 that read data is inserted into shift register 101. The line start detector is essentially an adder. It counts the number of bits not corresponding to the line start pattern. When this count equals four or more, an error is indicated. Bits 5, 9, 12 and 14 from the shift register (the one bits in the pattern) are inverted so that the input to the line start detector will be 14 lines at zero level when the pattern is correct.

Figure 7:
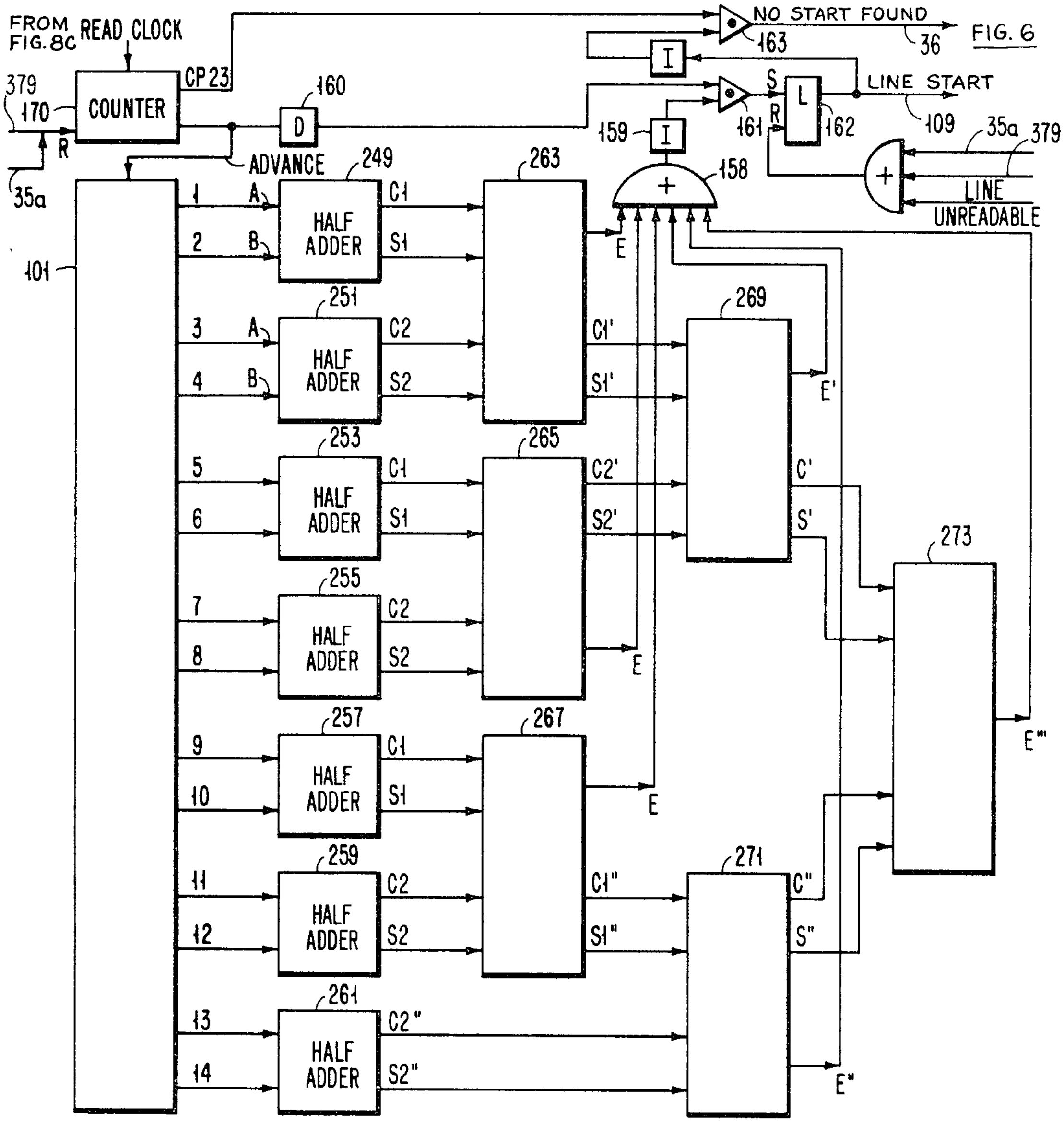
FIG. 7 is a representation of apparatus for detecting the beginning of a data block.

In FIG. 7, blocks 249, 251, 253, 255, 257, 259, 261 are half-adders. The two inputs to each are added with one exclusive OR and one AND circuit. The output of the AND is the carry C and the output of the exclusive OR is the sum S. A bit on the sum line is indicated by (1), while a bit on a carry line is indicated by (2). The logic equations for each half-adder are given below:

$$S = A \oplus B$$
$$C = A \cdot B \qquad (A)$$

where $\oplus$ denotes a logical EXCLUSIVE OR $\cdot$ denotes a logical AND.

Also, + denotes a logical OR in Equations (B) – (G) below.

For adders 249, 253, 257, these sum and carry terms are denoted S1, C1. For adder 259, these terms are denoted S2, C2. For adder 261, these terms are denoted S2″, C2″. But in each case, they are formed according to the generalized equations (A).

Blocks 263, 265, 267, 269, 271 add their respective two input pairs and generate an error if the sum exceeds three. If the sum does not exceed three, the sum is placed on the S and C outputs of the block. The final block, 273, merely checks for a sum in excess of three. A signal is sent out of the E‴ line if this is the case, and no line start is detected. The logic equations for blocks 263, 265, and 267 are:

263:

$$E = C1 \cdot C2$$
$$S1' = S1 \oplus S2 \qquad (B)$$
$$C1' = C1 + C2 + S1 \cdot S2$$

265:

$$E = C1 \cdot C2$$
$$S2' = S1 \oplus S2 \qquad (C)$$
$$C2' = C1 + C2 + S1 \cdot S2$$

267:

$$E = C1 \cdot C2$$
$$S1'' = S1 \oplus S2 \qquad (D)$$
$$C1'' = C1 + C2 + S1 \cdot S2$$

The logic equations for 269 are:

$$E' = C1' \cdot C2' + C1' \cdot S1' \cdot S2' + C2' \cdot S1' \cdot S2'$$
$$S' = S1' \oplus S2' \qquad (E)$$
$$C' = C1' + C2' + S1' \cdot S2'$$

The logic equations for block 271 are:

$$E'' - C1'' \cdot C2'' + C1'' \cdot S1'' \cdot S2''$$
$$S'' = S1'' \oplus S2'' \qquad (F)$$
$$C'' = C1'' + C2'' + S1'' \cdot S2''$$

The logic equations for block 273 are:

$$E''' = C' \cdot C'' + C' \cdot S' \cdot S'' + C'' \cdot S' \cdot S'' \qquad (G)$$

It will be noted from equations (B) through (G) that there are eleven possible signal terms comprising the E signal outputs for the various adders (one each for adders 263, 265, 267; three for adder 269; two for adder 271; three for adder 273). Each of the E terms in FIG. 7 are Ored together in OR gate 158. If any of these eleven composite terms are active, one of the E signals will activate the OR gate to cause the output of the following inverter 159 to be inactive. A clocking pulse which can be developed, for example, from the read clock of the reading facility advances shift register 101 via the advance line and presents a new 14 bit pattern to the line start detector each clock time. The advance line is also connected through delay 160 as an enabling input to AND gate 161. The output of AND 161 is connected to the set side of latch 162. The output of latch 162 is the line start signal 109 originally seen in FIG. 6 and is also connected via an inverter to AND 163. The other input to AND 163 is a signal from the counter which is activated at the end of the 23rd clock time. If at the end of 23 read clock periods, a start has not been found, this is taken to indicate that a start cannot be found and line 36, no start found, also seen in FIG. 6, is activated.

In operation, at a certain period of time into the data line, which can be specified by a clock synchronization pulse developed in a manner well-known in the digital recording arts, the reader clock advances counter 170 which advances the shift register 101 to present a 14 bit pattern to the line start detector. A delay D is required for the new pattern to ripple through the detector and stabilize its output. If no error has been found, the output of inverter 159 will be activated at the time the sampling pulse arrives via delay 160, and the output of AND gate 161 will set latch 162 to generate a signal on LINE START line 109. This happens each clock period until a successful line start is found or until the 23rd clock period is detected at which time AND 163 is sampled. If line 109 is not then active, the output of AND 163 will activate the NO START FOUND line 36.

It is to be noted that the disclosed start pattern is not limited to 00001000100101 but can be any start pattern preceded by a number of sync bits, where the sync and start pattern is one of the form $$X^m \bar{X}^n X \ldots \bar{X}^3 X \bar{X}^2 X \bar{X}^1 X$$

where $X$ is a data representation, $\bar{X}$ is the complement of $X$, $n$ is the number of times $X$ is repeated and m is at least the number of $X$ bits necessary for clock synchronization. In general, the line start pattern detector will count the number of bits not corresponding to the line start pattern. When this count equals $n$ or more, an error is indicated. That is to say, a start pattern of the type disclosed will allow the detection of the start of the line even in the presence of up to $n-1$ errors in the start pattern.

In an extended line start pattern detector, the inputs from the one bits of the start pattern will be inverted as was explained for the line start detector of FIG. 7. Logic equations (A) – (G) can be extended to count $n-1$ errors.

Power Sum Calculators

Error detection circuits monitor data from the reader by character. Each six-bit character is applied in parallel to 11 check sum calculating circuits of FIG. 6A. After 63 characters have been received, the check sum registers are tested for error. Zero register content (zero check sums) indicates the data line is free of error. Non-zero check sums indicate one or more errors. Check sum values indicate magnitude and location of an error or errors. The sums are transferred to the error correction facility for analysis.

The line of data is held in the device buffer while error analysis and correction takes place. After correction is complete, the revised line of data is read out of the buffer 17 and applied to the check sum calculating circuits. Zero sums indicate successful correction and reading continues with the next line. Non-zero sums cause the same line to be read again.

ERROR CORRECTION FACILITY

The error correction facility includes an error correction decoder which has facilities for use in two, three, four and five error correction. SIngle error correction is done utilizing a fast table look-up scheme. Data recovery is done using a statistically optimized scheduler which schedules parameter variation in the storage facility to allow a possibly better read upon rereading of the data, if the first reading of the data has been in error and uncorrectable.

Figures 8, 8A:
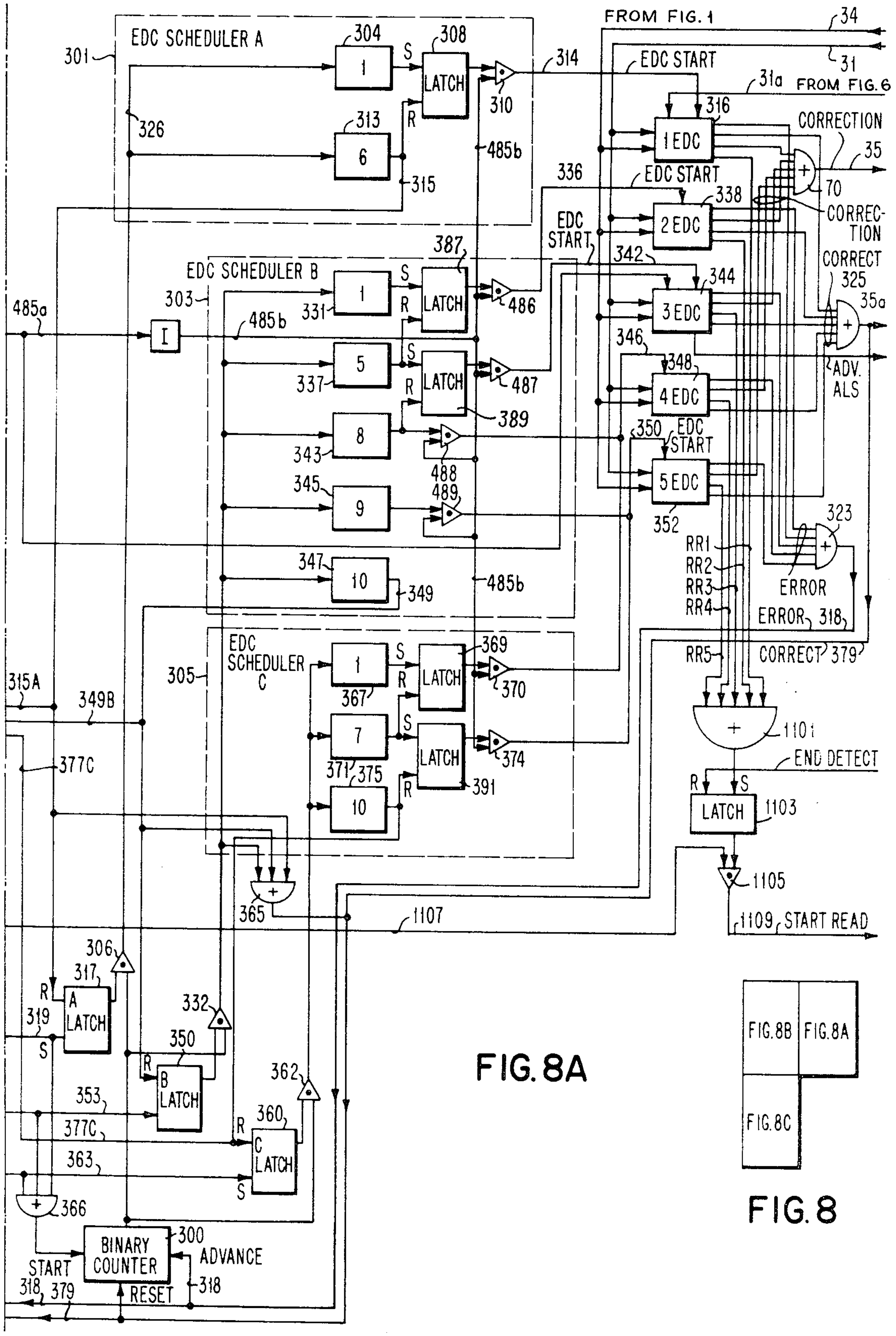
FIG. 8 is a representation of how FIGS. 8A–8C should be placed relative to each other.
FIGS. 8A–8C are a representation of the parameter and correction schedulers in the error correction facility of the invention.
Figure 8B:
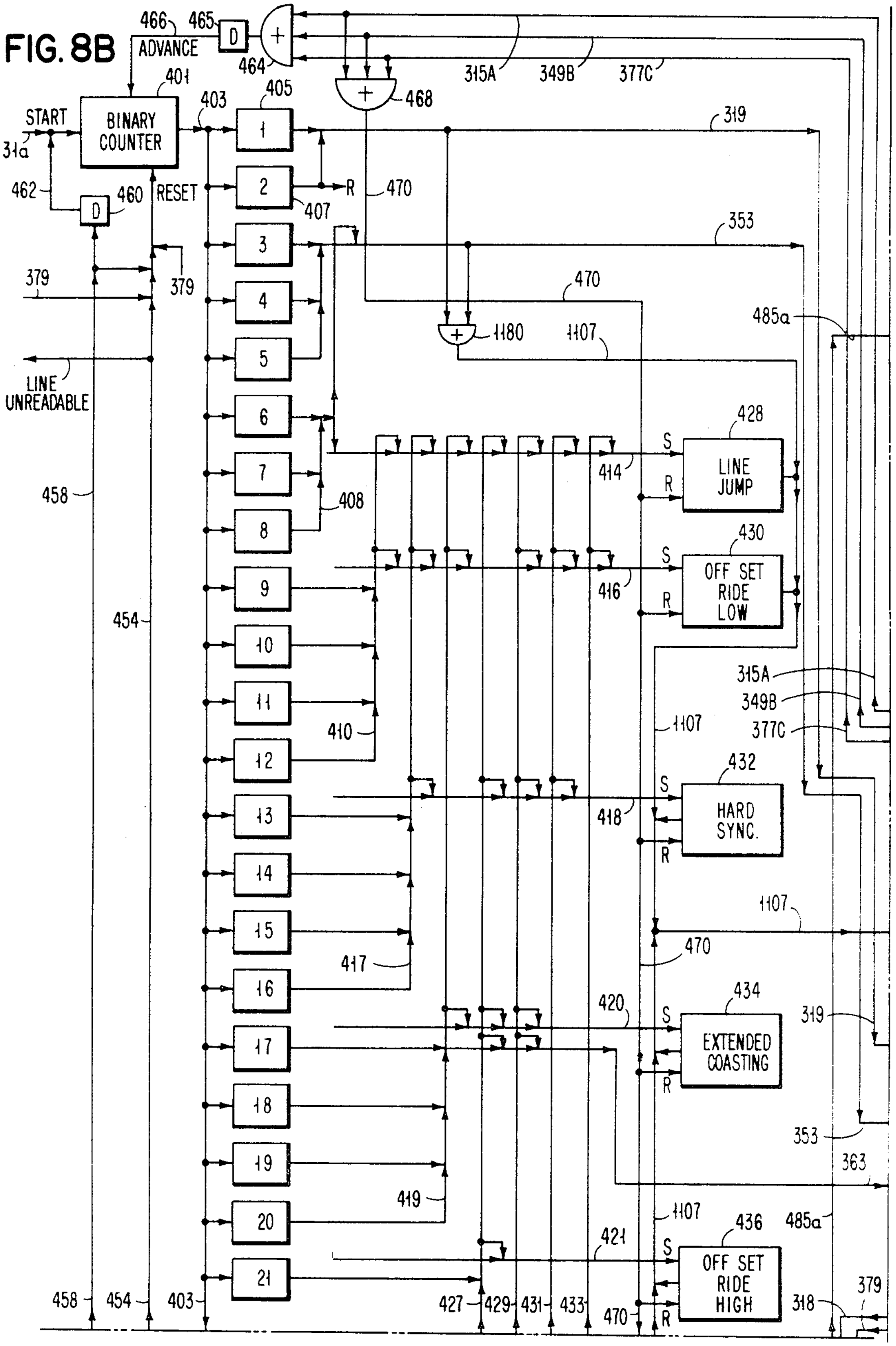
Figure 8C:
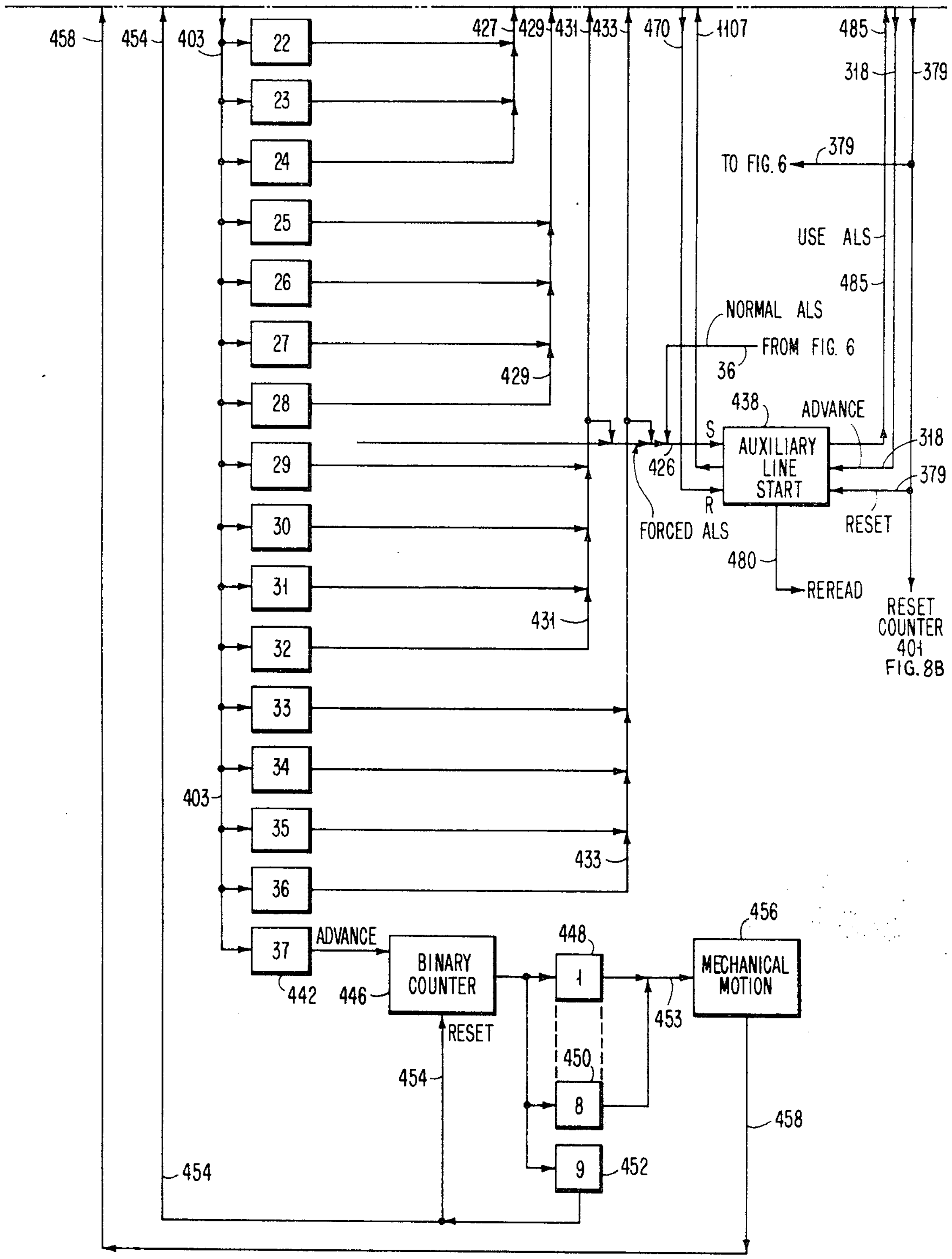

Referring first to FIG. 8, there is seen the manner in which FIGS. 8A 8C should be placed relative to each other in order to better understand the parameter scheduler and EDC schedulers of the invention.

It will be recalled from the theory of Reed-Solomon codes that for the code used in the present example, there are eleven single-character results of root substitution containing information as to location and magnitude of the errors. The error detection decoder of the present invention solves up to ten equations and ten unknowns. The ten unknowns are the five locations and the five error magnitudes to allow correction of five errors. The eleventh resulting character can be used as error detection.

Usually there is only one error, and its correction is referred to as 1-EDC (Error Detection and Correction). In this case it is necessary only to solve two equations and two unknowns, that is, the error location and the error magnitude. A special single error apparatus using table look-up is tried immediately upon first detecting an error. The results become available, the correction is made in the buffer 17, and the repaired line is read out of the buffer and rechecked for error. If a Photo-Digital Storage System such as the one described previously is the vehicle within which the present invention is embodied, the repaired line can be rechecked for error in less time than it takes the scanning spot to loop around to where it is about to start reading the line again. If the correction is successful, the line can be passed over and the following line can be read. If not, the line is reread and checked again according to the EDC schedules to be discussed subsequently. If the line is still incorrect after the 1-EDC schedule, the schedulers will attempt 2-EDC, 3-EDC, 4-EDC and 5-EDC respectively, with reader parameter variation as will be discussed.

Error Recovery Procedures

If a line is read in error, and cannot be corrected after a given number of attempts with an EDC scheduler, physical parameters in the reading facility are varied with a parameter scheduler; and correction is tried again according to an EDC scheduler. Several parameter variations will now be described.

Line Jump

Line jump is a feature of the invention which makes use of the fact that line numbers of adjacent line pairs are numerically consecutive. A line in the vicinity of the desired line is read, and corrected if necessary. The numeric difference between this corrected line's number and the desired line's number is computed. This difference provides a relative distance and direction information to help find the desired line. The process varies for executing the line jump. A line from which to base a direct jump may already be available; that is, a line may already be read and corrected, but may be of the wrong line number. If so, the method of line jump begins at step 6 below. If not, an arbitrary line jump is used to gain such a line. Specifically, steps 1 – 5 below are executed for an arbitrary line jump and followed by steps 6 – 10 for a direct line jump.

1. The reader is forced to loop on an opaque pair, independent of line-number compare results.
2. One scan-turn is then forced to be opposite to the normal forced looping turn; the reader resumes looping, but on a pair adjacent to the first. This is one step in a jump.
3. Three such steps, for example, are taken in one arbitrary direction.
4. A special command is issued to read the line in the same sweep direction as the desired line, no matter what its number is.
5. If the line so read is not correct or correctable, steps 3 and 4 are repeated.
6. If the line read is correct or corrected, its line number is used to compute D, the number of line pairs distant it is from the pair containing the desired line number.
7. D steps are then taken toward the desired line.
8. Assuming the reader is not looping on the desired line, a special read command is again issued to read the line, regardless of its line number.
9. If, in either steps 4 or 8, the line is not only correct or corrected, but also of the desired line number, it is sent to the utilization system.
10. The reader is forced on to the next desired line because the line number of the line just corrected may not be reliable enough. Then, reading resumes to obtain the next line.

Hardened Clock Synchronization

If the invention is embodied in a Photo-Digital System such as that described above, emulsion shifts on the recording medium can cause an apparent sudden shift in the data rate. If this is severe, the clock transition tracking servo utilized in reading may not follow the shift, and synchronism is lost. Occasionally, a difficult line can be read by reducing the clock servo damping factor to make the servo more aggressive so that it will track more extreme clock frequency shifts. This is called hardened clock sync, and can be commanded by the scheduler to be described subsequently.

Offset Scanning

In a Photo-Digital System, the scanning spot normally travels along the data line so that its geometric center moves parallel and halfway between a transparent base line and an opaque base line. This is done by a line servo such as that described in the above co-pending application. Any divergence from this path is generally accompanied by a notable increase in single error correction activity. However, some marginal lines can be read only if the spot is offset high or low from the center position. This can be done by forcing a DC bias into the voltage controlling the offset of the scanning spot. One reason for using offset scanning in a Photo-Digital System is that a particular flaw looks slightly different at the offset position. Another reason is that very dark or very transparent flaws tend to steer the spot off course somewhat before the effect is electronically detected. This can be compensated for by the high or low offset in the opposite direction.

Extend Coasting

In a photo-digital system there may often be an optical "-hole" in the recording medium. An optical hole is a situation in which extreme light or extreme dark is detected by the optically sensitive reader. It will be recalled that both a line following servo and a clock tracking servo are used in a photo-digital read facility. Extended coasting essentially takes a guess at the average hole size in the recording medium. In other words, when a hole is detected, an order can be given to the clock servo to cease following the clock transition, and to the line following servo to cease following the line. This is done for a fixed length of time. At the end of that time, the servos are turned on again in an attempt to follow the line and the clock. The result may be successful and allow correct of the line. One manner of implementing extended coasting is to allow the detection of extreme light or extreme darkness in the reader for a given period, say two bit times, to fire a single-shot, the output of which will hold the two servos off for the time period of the single shot. The desired time period of the single shot can be empirically optimized. At the end of that period the servos can be turned back on to try to read and correct the line.

Auxiliary Line Start

Auxiliary Line Start (ALS) is of two types, normal auxiliary line start for the case where a line start pattern was not detected where it should have been detected, and forced auxiliary line start, used later on in the recovery procedure to be described subsequently. Auxiliary line start logic is provided which searches for the beginning of the data field when a normal line start cannot be found. Search strategy includes the counting of a certain number of clock pulses, beginning at a clock synchronization point, which should bracket the expected position of the start pattern. This position can be determined empirically from the turn characteristics of the reader. Data is read immediately after this. The number of clock pulses counted after clock sync varied over a range of 33 to 39 which, for one embodiment, bracketed the beginning of the encoded data. When one of the reads then indicates a correct or correctable line, probability is very high that the data is good and the line is therefore accepted.

EDC SCHEDULES

In the present embodiment there are assumed to be four EDC schedules A, B, C and C1. These schedules optimally schedule 1–EDC through 5–EDC. One example of these schedules is shown in Table A below.

| EDC Schedule | Attempt No. 1 | 2 | 3 | 4 | 5 | 6 | 7 | 8 | 9 |
|---|---|---|---|---|---|---|---|---|---|
| A | 1 | 1 | 1 | 1 | 1 | – | – | – | – |
| B | 2 | 2 | 2 | 2 | 3 | 3 | 3 | 4 | 5 |
| C | 4 | 4 | 4 | 4 | 4 | 4 | 5 | 5 | 5 |
| C1 | 3 | 3 | 3 | 3 | 3 | 3 | 3 | 3 | 3 |

For example, EDC scheduler A schedules five attempts at single error correction. Likewise, EDC scheduler B schedules four attempts at 2 error correction followed by three attempts at 3 error correction followed by one attempt each at 4 and 5 error correction. Schedulers C and C1 are similar to the above. If any of these attempts result in a corrected data line the process is concluded. The error-correction schedules of Table A can be used in a parameter-scheduling scheme such as that seen in Table B.

TABLE B

| Action number | ALS | Extended coasting | Hard sync | Offset ride high | Offset ride low | Line jump | Reread with EDC schedule |
|---|---|---|---|---|---|---|---|
| 1 | | | | | | | A |
| 2 | | | | | | | A |
| 3 | | | | | | | B |
| 4 | | | | | | | B |
| 5 | | | | | | | B |
| 6 | | | | | | x | B |
| 7 | | | | | | x | B |
| 8 | | | | | | x | B |
| 9 | | | | | x | x | B |
| 10 | | | | | x | x | B |
| 11 | | | | | x | x | B |
| 12 | | | | | x | x | B |
| 13 | | | x | | x | x | B |
| 14 | | | x | | x | x | B |
| 15 | | | x | | x | x | B |
| 16 | | | x | | x | x | B |
| 17 | | x | | | x | x | C |
| 18 | | x | | | x | x | C |
| 19 | | x | | | x | x | C |
| 20 | | x | | | x | x | C |
| 21 | | x | x | x | | x | C |
| 22 | | x | x | x | | x | C |
| 23 | | x | x | x | | x | C |
| 24 | | x | x | x | | x | C |
| 25 | | x | x | | x | x | C |
| 26 | | x | x | | x | x | C |
| 27 | | x | x | | x | x | C |
| 28 | | x | x | | x | x | C |
| 29 | x | | x | | x | x | C1 |
| 30 | x | | x | | x | x | C1 |
| 31 | x | | x | | x | x | C1 |
| 32 | x | | x | | x | x | C1 |
| 33 | x | | | | x | x | C1 |
| 34 | x | | | | x | x | C1 |
| 35 | x | | | | x | x | C1 |
| 36 | x | | | | x | x | C1 |
| 37 | (8 times, do mechanical motion and repeat actions 1–36) | | | | | | |

As can be seen, when an error is detected, the first action is to immediately perform 1–EDC with EDC Schedule A. If no correction is obtained after that schedule, the second action is to retry EDC Schedule A. Actions 3, 4 and 5 do the same thing with Schedule B. If after these five actions the line is not found to be correct, then EDC Schedule B is tried with a line jump. That is, a line jump is tried, as explained above. After line jump is successfully performed, the line is re-read while trying to correct any errors which occur, using EDC Schedule B. This continues through action 8. Beginning with action 9, a line jump with offset ride low is performed in the reader; when these are complete a re-read is performed and EDC Schedule B is performed. The ensuing actions proceed similarly, as can be seen by reading down the table. A re-read follows the beginning of each action after the indicated parameter variation is performed, and correction proceeds using the indicated EDC schedule.

EDC SCHEDULERS

Turning now to FIG. 8A, there are seen the three EDC schedulers 301, 303, 305. Lines 319, 353, 363 act as set lines to A latch 317, B latch 350, and C latch 360, respectively. Each of the last-named lines are OR'd in OR gate 366 to act as a start line to binary counter 300. Each above-named latch selects its respective EDC scheduler by way of AND facilities 306, 332, 362, the other input to each being counter 300.

EDC SCHEDULER A

The output of AND 306 is Bus 326 which is connected to decoders 304 and 313. Decode 1 (304) supplies an output pulse when the sequence 1 is received from the counter.

Decode 5 (313) supplies an output pulse when the sequence 5 is received from the counter. The output of decode 304 is a set line to latch 308. The output of decoder 313 is a reset line to latch 308, and also to latch 317 to de-select EDC Scheduler A. The output of latch 308 is the EDC START line which is gated with line 485*b* in AND 310, the output of which AND is 1-EDC START line 314. Line 485*b* is the complement of line 485*a*. If line 485*a* is active, it is an indication that Auxiliary Line Start is going to override every EDC Schedule selection. Consequently, 485*b* if inactive will block all EDC selection but if active will enable normal EDC selection. This will be treated in more detail subsequently. Line 31*a*, from the error correction facility of FIG. 6 is activated the first time an error is detected and immediately starts 1– EDC. Line 31, originally from the above error detection facility is gated in each EDC facility with the respective EDC START line to begin the respective EDC activity, as will be subsequently explained in detail. Line 31 will be effective to begin activity on every EDC try after the first try of Action 1, since on that first try line 31*a* will immediately start 1–EDC without waiting for the EDC Scheduler circuitry to settle, in order to enhance speed. Line 31*a* will normally only be active on the first error detection as can be seen from FIG. 6 where AND 129*a* fires trigger 130 which sends a pulse out on 31*a*, but is immediately extinguished by latch 131, which thereafter holds trigger 130 off until either line 379 indicates the data line in error is corrected or the data line is determined unreadable.

As seen from Table A, single error correction is tried five times. That is, the first error indication will cause line 31*a* of FIG. 8A to immediately start 1–EDC on the incorrect data line in the buffer. A correction will be tried on the line in the buffer by sending the computed correction over the 1–EDC correction bus seen in FIG. 8A, said correction being passed through OR 70 and over bus 35 to the buffer so that the correction can be attempted. After an attempt is made to repair the line, it is sent back over line 34 to be rechecked through error detection circuitry again. If the repair is proper and the data is correct, the correct line emanating from 1–EDC 316 and serving as an input to OR gate 325 in FIG. 8A will activate line 35*a*, originally seen in FIG. 1, to indicate to the buffer that the repaired line is indeed correct and should be sent to the utilization system. Concurrently, line 379 will reset all counters in the system to reset it to its initial condition ready to read the next line. If the attempted correction resulted in the repaired line still being incorrect, the reread line RR1 will request a re-read from the storage facility and the ERROR line emanating from 1–EDC 316 and connected as an input to OR gate 323 of FIG. 8A will be active causing ERROR line 318 to advance binary counter 300 to try 1–EDC the second time according to EDC schedule A. This continues until after the fifth try binary counter 300 is advanced to 5 and the output of decode 313 resets latch 308 to end EDC Schedule A, resets counter 300 over line 315 via OR gate 365, resets A latch 317 to deselect the EDC scheduler A, and also advances binary counter 401 of FIG. 8B via OR gate 464 over line 315A. This steps the parameter scheduler to its second action noted in Table B.

EDC Scheduler B

EDC Scheduler B is structured similarly to EDC Scheduler A. For example, in FIG. 8A, 353 is a set input to B latch 350, the output of which is an enabling input to AND 332. The other input to AND facility 332 is output bus of counter 300. The output of AND 332 is connected to decoders 331, 337, 343, 345 and 347 which decode counter sequences 1, 5, 8, 9 and 10, respectively. The output of decoder 331 is connected as a set line to latch 387, the output of which is gated with line 485*b* in AND 486. The output of AND 486 is EDC Start line 336 for 2–EDC. The output of decoder 337 is a reset line to latch 387 and a set line to latch 389. The output of latch 389 is gated with line 485*b* to form EDC Start line 342 for 3–EDC. The output of decoder 343 is a reset to latch 389 and also is gated with 485*b* to form EDC Start line 346 for 4–EDC. The output of decoder 345 is gated with line 485b to form EDC Start line 350 for 5–EDC. The output of decoder 347 is line 349 which resets B latch 350 and also resets binary counter 300 via OR 365. Operation of EDC Scheduler B is in accordance with EDC Scheduler B in Table B.

EDC Scheduler C

EDC Scheduler C, seen at 305 in FIG. 8A, is similar to EDC Scheduler B. C latch 360 selects AND 362 to gate the output of counter 301 to decoders 367, 371 and 375 which respectively decode sequences 1, 7 and 10. The outputs of decoders 367 and 371 set and reset latches 369 and 391 as shown which form gated EDC Start lines to 4–EDC and 5–EDC as shown. Operation is in accordance with Schedule C of Table B.

1-EDC Facility

A typical EDC facility is seen in FIG. 8B–A for 1–EDC. Bus 34 is connected to AND 72, the other input of which is a line from the 1–EC (Error Correction) which indicates a correction has been tried. This line could be the output of a latch set by the transmission of a correction and reset by the receipt of a data correct signal, for example. The output of AND 72 is an input to Error Detection circuitry 74. Error Detection circuitry 74 can be the same type circuitry as in FIG. 6 and, in fact, can be same physical circuitry in the system with proper gating well-known to those skilled in the art. Line 84 is an error line which both indicates an error and also requests a re-read of data by line RR1. Data Correct line 76 is connected from error detection circuitry 74. Line 31*a* from FIG. 6 is connected to line 82 to immediately start 1 error correction the first time an error is detected. Line 31 from the error detection facility of FIG. 6 is connected as a gating input to AND 80 along with EDC Start 314 originally seen in FIG. 8A.

In operation, the first time the error correction facility of FIG. 6 detects an error, line 31*a* immediately starts 1-error correction in the 1–EC facility seen generally in FIG. 8B-A. A correction is determined by 1–EC and sent via the Correction bus to OR 70 of FIG. 8A which sends the correction to the data line in the buffer via bus 35. A correction indication also enables AND 72 over line 75. An attempted correction is made in the buffer and the corrected data is sent over simplex bus 34 to all EDC facilities seen in FIG. 8A. Since 1–EC has just been tried, line 75 in FIG. 8B-A will gate the corrected data to error detection circuitry 74 for a recheck, since we are using less than the maximum power of the code, and there may have been more than one error. If the data is correct, correct line 76 will be activated to activate OR 325 in FIG. 8A to send a data correct indication to buffer 17 via line 35*a* to allow the corrected data line to be sent to the buffer.

If the recheck indicates the data line is still in error, error line 84 in FIG. 8B-A activates OR 323 of FIG. 8A to activate line 318 to advance counter 300 to its second sequence. EDC START line 314 in FIG. 8A remains active. Error line 84 in FIG. 8B-A also causes line RR1 of FIG. 8A to request a re-read by setting latch 1103 through OR 1101 to try 1–EDC a second time. If line 1107 in FIG. 8A is active indicating all parameters in the reader are settled (to be discussed subsequently) then latch 1103 output will be gated through AND 1105 to start the re-read. The re-read data will be passed through the Error Detection facility of FIG. 6. If the data line is still in error, line 31 will be active (line 31*a* will be held off by trigger 130) and will gate EDC Start line 314 of FIG. 8B-A to start 1-error correction. The process continues until the data line in rechecked correct or until decode 313 of FIG. 8A indicates the EDC Schedule A is complete, at which point the next action in the parameter schedule is initiated.

Turning now to FIG. 8A-A there is seen the apparatus for performing single error correction, seen generally at 73 in FIG. 8B-A. In FIG. 8A-A are seen power sum calculators $S_0$ and $S_1$ from the group of power sum calculators originally seen in FIG. 6A. Line 82, seen originally in FIG. 8B-A, gates the contents of the two power sum calculators to a table look-up which addresses a log table to select the values of $\log_\alpha S_0$ and $\log_\alpha S_1$. It is desired to determine the error location number $Y = S_0/S_1$. This is done by subtracting $\log_\alpha S_1$ from $\log_\alpha S_0$ in a Mod-63 subtractor as seen in equation 4, previously. The resulting number is translated to a corresponding buffer address in the address translator to arrive at the error location. Since power sum calculator $S_0$ has as multiplicative factor the term $\alpha_0$, the multiplier for $S_0$ in FIG. 6B would have a straight through bus from register 135 to Exclusive OR 133. Hence $S_0$ acts as a longitudinal parity check so that the error magnitude in FIG. 8A-A is found directly as the contents of power sum calculator $S_0$ and is sent along with the error location as the Correction bus.

Coarse Compare

Coarse compare is a line number recovery process which makes use of the fact that the two line numbers in an opaque pair are equal and physically separated, being differentiated by an even/odd indicator. One chip flaw is not likely to disturb both numbers.

If a line number is found not equal, the reader begins a search on the line pair. A counter is incremented each time the search process encounters a reversal of scan turn direction. A count of 6 is taken to mean that the scanning spot is looping. (Reversals may not be consecutive due to the possible randomness of marginally read line numbers.) In the assumption that looping is occurring, the hardware:

1. Forces the spot to loop on one opaque pair of lines and to include in this loop the line of the original loop which is in the same sweep direction as the desired line.
2. Allows either line number in the opaque pair to compare with the desired line number.
3. Considers the line found and worthy of correction if a line number compare-equal occurs.
4. Generates a signal which indicates coarse compare is not effective if a compare-equal does not occur.

When coarse compare is not effective, it is assumed that too many line numbers in the vicinity of the desired line are wrong or random. Then, the line-jump feature is needed to find the correct line.

Auxiliary Line Start Logic

In the situation in which a data line is being read and the line start detector 105 of the error detection facility of FIG. 6 fails to detect a line start pattern, line 36, NO START FOUND, is activated. In this situation, a function called Auxiliary Line Start, discussed generally previously, is performed. This is always tried with 3–EDC. If started by virtue of line 36, it is called Normal ALS. It may also be started by virtue of part of the data recovery schedule in Table B, EDC Schedule C1. In either case, it overrides EDC schedules A, B and C. The auxiliary line start logic is seen in detail in FIG. 8C-A. In 1, 2, 3-error correction, there is a satisfactory degree of certainty that the correction is a valid one, even if there is no confidence in line synchronization. That is, if the line read is started on the wrong bits so that all data is shifted *n* positions, the probability of achieving an indicated success in correction is very small. If the error correction facilities indicate that a line is corrected, it is almost certain that it has been read starting with the first data bit. For 4-error correction this condition is marginal; for 5-error correction, it is not satisfactory at all. Auxiliary line start is a trial-and-error approach to finding the first bit of the line by trying the seven most-likely bit positions. When a line is attempted to be read in this situation, the error correction facility uses exclusively the 3-error correction facility. There may be less than three errors, but as only one of seven ALS reads can be correct or correctable, it is wasteful to use 1, 2 and then 3-error correction as is normally done. Normal ALS line 36 or Forced ALS line 426 act as a set input to latch 951, the output of which is line 485, USE ALS. When this line is active, it means to use ALS mode with the ALS line start position indicated by line 480, to be explained subsequently. The reset line for latch 951 is formed by Data Correct line 379 or line 318, which is the error indicator line, via delay D. Line 485 also acts as a gating input to AND 968. Line 318 is a second input to AND 968. The output of AND 968 acts as an advance line to binary counter 955. Binary counter 955 is an eight sequence counter. Counts 0 to 6 are set into ALS Counter 957 as an initial Value therefor, over bus 956. The 7 sequence resets binary counter 955 to zero. The output of ALS counter 957 is connected to decode 959 which activates ALS POSITION line 480 when ALS counter 959 reaches a sequence of 39. As will be later appreciated, the values 0 to 6 over bus 956 and 39 for the decode are by way of illustration only and in no way limits the invention to these values. The output of AND 968, labeled ALS TRIED AND FAILED, is connected as an activating line to line 31*a* of FIG. 6 via AND 1190 gated with the inverted output of latch 131. Clock sync line 967 acts as a set input to latch 969, the output of which is one input to AND 973, the output of which is an advance line to ALS counter 957. READ CLOCK line 971, which transmits signals from the read clock after it is synchronized for reading a given data line, forms a second input to AND 973. Thus, ALS counter 957 is advanced once each clock time.

In operation, the ALS logic attempts to read a line at one of seven, for example, most likely positions at which the data characters of the line should start. In the present example, it is assumed that data should start somewhere between the 33rd and 39th clock time after clock sync. When either line 36 or 426 set latch 951, line 485 becomes active. Lines 36 or 426 also cause the read facility to loop on a line pair. On the first loop pass over the line in question, after the rise of lines 36 or 426, ALS is performed as follows: The count of binary counter 955 is set into ALS counter 957. When Clock Sync 967 becomes active, latch 969 is set. Each read clock pulse over line 971 advances ALS counter 957 until its sequence is 39, at which time line 480 indicates that the reader is at the ALS POSITION to try an auxiliary line start. If the number set into ALS counter 957 was 6, the number of clock pulses counted before ALS Position is 33. If it was 0, the number of pulses counted is 39. Operation continues, referring to FIG. 8B-B, which shows the ALS logic of FIG. 8C-A as box 438, and also details the 3–EDC Facility. The 3–EDC Facility is similar to the 1–EDC Facility of FIG. 8B-A, except for the control lines associated with ALS. ALS operation will be described by referring to FIGS. 8A, 8B-B, and 8C-A, concurrently. ALS Position line 480 requests a re-read at the ALS Position in the data line. This data is gated via AND 849 since USE ALS line 485 is active to set ALS latch 848 to enable AND 849. The output of AND 849 gates the data from the read data line to the error detection circuitry but bypasses the line start detector since the system is now attempting ALS without regard to the start pattern. If the data is indicated correct, DATA CORRECT line is activated to OR 325 of FIG. 8A and the system assumes the data line is read correctly and the ALS was therefore successful. If an error is found, error correction proceeds as in a normal EDC attempt and line 318 will advance counter 301 of FIG. 8A and will also advance binary counter 955 of FIG. 8C-A via AND 968. After a relay 318 will reset latch 951, the delay insuring AND 968 will be conditioned to advance counter 955 before the reset of latch 951. If the ALS were a Normal ALS, AND 968 would form ALS TRIED AND FAILED line which is gated with the inverse of line 1189 of FIG. 6. This would activate line 31*a* of FIG. 6 to place the system at the beginning of the error recovery procedure to try to correct the line. If ALS were forced (i.e. from actions 29–36 of Table B) then 1189 would be active and inhibit the output of AND 1190 so that the next try takes place according to the current EDC Schedule in operation. In either case, if the data is correct, line 379 resets latch 951 in the ALS logic.

It will be noted that the ALS counter 957 of FIG. 8C-A is advanced every clock pulse time via AND 973 regardless of whether ALS is in use. However, output 480 will be ineffective until such time as USE ALS 485 is active. Also, each time an ALS is successful, the count from counter 955 is preserved since counter 955 is not thereafter advanced. Therefore on the next ALS try, the last previous successful count will be set into ALS counter 957 as it has a higher probability of initiating another successful ALS.

Parameter Scheduler

The operation of the parameter scheduler, the structure of which is seen in FIGS. 8B and 8C placed relative to each other as seen in FIG. 8, can be seen with reference to Table B. The structure of the parameter scheduler will be discussed first and its operation will then be discussed with reference to Table B. Start line 31*a*, originally seen in FIG. 6, is used as a start line to binary counter 401 which acts as an action selector. The output of binary counter 401 is Bus 403 connected to decoders 405 – 442, each of which is a binary to one out of N decoder, selecting the number located in the individual box. Decode 1 and 2 are connected to line 319 which is in turn connected as a setting pulse to A latch 317 of FIG. 8A and to OR 366 of the same figure to select EDC Scheduler A. Decodes 3 – 5 are connected to line 353 which supplies a setting pulse to B latch 350 and as an input to OR 366 of FIG. 8A to select EDC Scheduler B. Decodes 6 – 8 are connected to line 408 which is connected as a set input to Line Jump 428 which was explained previously. Decoders 9 – 12 are connected to line 410 which is connected to line 414, and also to line 416 which is connected to offset ride low 430. Offset Ride Low has been described previously. Decoders 13 – 16 are connected to line 417 which is connected to line 414, 416 and 418. Line 418 supplies a set pulse to Harden Synchronization 432 which was described previously. Decoders 17 – 20 are connected to line 419 which is connected to lines 414, 416, 420 and also 363 to select EDC Scheduler C. Line 420 is a set input to Extended Coasting 434, which was explained previously. Decoders 21 – 24 are connected to line 427. Line 427 is connected to lines 414, 418, 420 and 421. Line 421 is a set input to Offset Ride High 436, which was described previously.

Decoders 25 – 28 are connected to line 429 which is an input to lines 414, 416, 418, and 420. Decoders 29 – 32 are connected to line 431 which has inputs to lines 414, 416, 418, and 426. Line 426 is the set input to Auxiliary Line Start 438, the details of which have been described subsequently. Decoders 33 – 36 are connected to line 433 which are inputs to lines 414, 416, and 426. The input to Auxiliary Line Start via lines 431 and line 433 will be termed forced auxiliary line starts since they are forced by the parameter scheduler. On the other hand, if the error detection circuitry of FIG. 6 does not detect a line start on a first detection of an error, when the system is not in a recovery schedule, line 36, which is labeled "no start found," will be activated. This line is connected as an input on FIG. 8C to auxiliary line start to try a "normal" auxiliary line start and then read the line to see if the data is correct or can be corrected without intervention of counter 401. Decoder 37 has as its output a start line to binary counter 446. The output of binary counter 446 goes to binary decoders 448 through 450 which respectively decode the counter sequences 1 – 8. Each time the binary counter is advanced, one of the decoders 448 – 450 starts mechanical motion in the storage facility. For example, if a Photo-Digital Storage is used as the system in which the invention is embodied, the mechanical motion would entail, for example, repositioning the chip on which the data is written and sweeping the chip with an air jet in an attempt to remove flaws from the developed data. When this is done, an activation of line 458 serves to start counter 401 via delay 460. Delay 460 is long enough to allow line 458 also to reset the binary counter 401. The sequence then starts over again. As seen in Table B, this sequence continues eight times, thus on the ninth advance of binary counter 446 the entire system is reset by a signal over the LINE UNREADABLE line which indicates that the data line cannot be recovered.

In FIG. 8B, both lines 319 and 353 have extensions which are inputs to OR 1180, the output of which is line 1107. Line 1107 is a gating input to AND 1105 of FIG. 8A. Line 1107 also has inputs from Line Jump 428, Off Set Ride Low 430; Hard Sync 432, Extended Coasting 434, Offset Ride High 436 and ALS 438. These inputs are active whenever the respective parameter variation from which they emanate are complete. This insures that no reread at the beginning of a new action begins until the system has settled. For example, at the fifth and last try of 1–EDC in Action 1, EDC Schedule A, line RR 1 of FIG. 8A will request a fifth re-read. This will not occur until counter 401 is advanced to Action 2 so that line 319 activates OR 1180 and line 1107 to enable the requested re-read via AND 1105 to start Action 2 error recovery.

Operation of the parameter scheduler of FIGS. 8B and 8C can be seen directly from Table B. When an error is first encountered, the error detection circuitry of FIG. 6 sends out a pulse over line 31*a*. This pulse starts 1–EDC in FIG. 8A immediately and also starts binary counter 401 which counts or schedules the actions seen in Table B. For example, during action 1 line 319 is activated to select scheduler A; and single error correction is tried five times. For a given try, if the correction given by the single error correction facility is not correct, a request to reread is made over line RR1 and 1–EDC is tried again. This continues five times and the sixth count of binary counter 300 which is decoded by decoder 313 of FIG. 8A resets the scheduler A system over line 315 and also causes line 315A to advance counter 401 via OR gate 464. The counter then goes to sequence 2 which again activates line 319 to try schedule A again according to the second action number in Table B. The next three actions, actions 3, 4 and 5 select schedule B which can be seen in detail from Table A. At action 6 the binary counter 401 will be advanced to the sequence 6 which will be decoded by the decoder for the sequence 6 seen in FIG. 8B. This will start a line jump. When the line jump is complete, line 1107 will be activated which acts as an enabling input to AND 1105 to start the re-read requested at the end of the final EDC try of the previous action. This reread forms the beginning of the first EDC try for Action 6. By working through the logic in a manner similar to that explained next above for the first five actions, it can be seen that the entire schedule of Table B is implemented.

ERROR CORRECTION FACILITY

Error Correction Decoder

Figure 9:
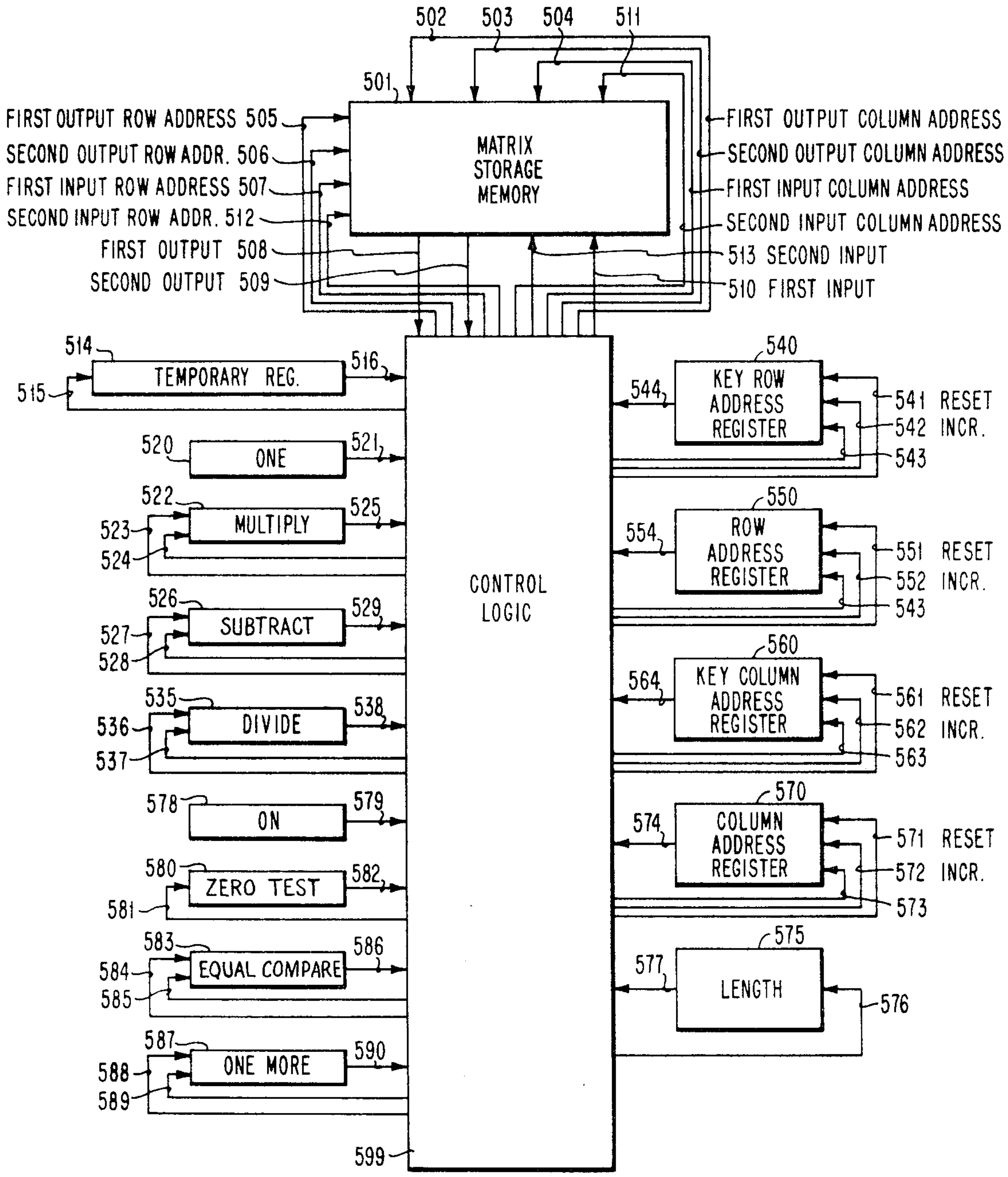
FIG. 9 is a representation of the error correction decoder of our invention.

Referring now to FIG. 9 there is seen the error correction decoder of the invention. In that figure is matrix storage memory 501. Matrix storage memory 501 is an M X N matrix store which is deep enough to accommodate all six bits of the power sums $S_i$. Matrix memory 501 is connected to control logic 599 by various data and control lines as shown. Line 502 is a line which selects a first output column address. Line 503 selects a second output column address. Line 504 selects a first input column address. Line 505 selects a first output row address. Line 506 selects a second output row address. Line 507 selects a first input row address. Bus 508 is a first output to the control logic 599. Bus 509 is a second output from matrix storage memory 501 to control logic 599. Bus 510 is a first input from control logic 599 to matrix memory 501. Line 511 is a second input column address. Line 512 is a second input row address. Line 513 is a second input bus from control logic 599 to matrix storage memory 501.

The matrix storage memory 501 will store a rectangular matrix with one more column than there are rows. Initially, it is loaded with the power sum matrix:

$$\begin{matrix} S_i & S_{i+1} & S_{i+2} & \cdots \\ S_{i+1} & S_{i+2} & S_{i+3} & \\ S_{i+2} & S_{i+3} & S_{i+4} & \\ \vdots & & & \end{matrix}$$

Thus, there are L rows and $L+1$ columns. The decoder of FIG. 9 will be used first to determine the non-trivial elementray symmetric functions and also to determine the error magnitude subsequently. After this process is complete, the result is contained in the first $L$ rows of column $L+1$, where $L$ is the final value of the column length register to be described.

Continuing with the description of the structure of the decoder, 514 is a temporary storage register having input 515 and output 516. Element 520 is a unity generator which has the identity element on its output 521 at all times. Multiplier 522 has first input 523 and second input 524, with output 525. Subtractor 526 has first input 527 and second input 528 and output 529. The subtractor subtracts the second input from the first input. Divider 535 has first input 536 and second input 537 from control logic 599. Line 538 serves as an output to control logic 599. Registers 540, 550, 560 and 570 are address registers. Each of these registers are reset if a logical on occurs at their reset line. They increment to a one larger value if there is a logical on at their increment line. An input value changes the values stored in the register to the input value. The value stored is made available on the output of the respective registers.

Register 570 is a column length register which is set to the number of errors to be found when the elementary symmetric function procedure begins. It can be changed by providing a new input value thereto. At the end of the calculation of the elementary symmetric functions, this register contains the number of errors found. Element 578 has an output which is always on. This may be, for example, a trigger which is always set to its on state. Element 580 is a zero test element and has its output on only if its input is at a zero condition. In element 583 is a comparison circuit which has its output on only if its first input 584 is equal to its second input 585. Circuit 587 is a one-more circuit. The output 590 of circuit 587 is on only if its first input 588 is one more than its second input 589. Circuit 587 may be, for example, a subtractor which subtracts its first input from its second input and tests for a 1 output using, for example, a binary to 1 out of N decoder set to decode a 1.

Control logic 599 is a complex switching circuit of logical elements. There are several ways to illustrate the structure of control logic 599. One manner would be to use logical AND and OR gates, as well as triggers and flip flops and the like. However, this tends to be confusing. Therefore, in order to more clearly show the control logic and its sequence of operation, various logical control connections will be shown in Tables 1 – 16 below.

The apparatus starts here after the matrix has been loaded in the matrix storage memory 501 and the number of errors sought is in the column length register 576.

| | | |
|---|---|---|
| | Control **600** | |
| | Start **601** | Next **603** |
| | Jump **602** | Alternate **604** |
| | Connect | |
| ON **579** | To | **541** Key Row Reset |
| ON **579** | To | **561** Key Column Reset |
| Next **603** | To | **611** |

Table 1: Reset Key Row and Key Column

| | | |
|---|---|---|
| | Control **610** | |
| | Start **611** | Next **613** |
| | Jump **612** | Alternate **614** |
| | Connect | |
| Key Row **544** | To | **505** Memory Output Row Address |
| Key column **564** | To | **502** Memory Output Column Address |
| Memory Output **508** | To | **581** Zero |
| Zero **582** | To | **612** Jump |
| Next **613** | To | **621** |
| Alternate **614** | To | **711** |

Table 2: Go to Control Sequence to Look for a Non-Zero Element If the Key Element Is Zero This allows the apparatus to start to divide the key row by the key element.

| | | |
|---|---|---|
| | Control **620** | |
| | Start **621** | Next **623** |
| | Jump **622** | Alternate **624** |
| | Connect | |
| ON **579** | To | **571** Column Reset |
| Start **621** | To | **631** |

Table 3: Reset Column

| | | |
|---|---|---|
| | Control **630** | |
| | Start **631** | Next **633** |
| | Jump **632** | Alternate **634** |
| | Connect | |
| Key Column **564** | To | **584** Equal |
| Column **574** | To | **585** Equal |
| Equal **586** | To | **572** Column Increment |
| Next **633** | To | **641** |

Table 4

| | | |
|---|---|---|
| | Control **640** | |
| | Start **641** | Next **643** |
| | Jump **642** | Alternate **644** |
| | Connect | |
| Key Row **544** | To | **505** First Output Address |
| Column **574** | To | **502** First Output Address |
| Key Row **544** | To | **506** Second Output Address |
| Key Column **564** | To | **503** Second Output Address |
| Key Row **544** | To | **507** First Input Address |
| Column **574** | To | **504** First Input Address |
| First Output **508** | To | **536** Divide |
| Second Output **509** | To | **537** Divide |
| Divide **538** | To | **510** First Input |
| ON **579** | To | **572** Column Increment |
| Column **574** | To | **588** One More |
| Column Length **577** | To | **589** One More |
| One More **590** | To | **642** Jump |
| Next **643** | To | **631** Loop to Step 3 |
| Alternate **644** | To | **651** |

Table 5: The Element in the Key Row is Divided by the Key Element And the Column Is Incremented. The Next Control Connection Is Back at 630 Unless This Is the Last Column

| | | |
|---|---|---|
| | Control **650** | |
| | Start **651** | Next **653** |
| | Jump **652** | Alternate **654** |
| | Connect | |
| Key Row **544** | To | **507** Input Address |
| Key Column **564** | To | **507** Input Address |
| One **521** | To | **510** Input |
| ON **579** | To | **551** Reset Row |
| Next **653** | To | **661** |

Table 6: Set Key Element to the Identity Element And Reset Row

| | | |
|---|---|---|
| | Control **660** | |
| | Start **661** | Next **663** |
| | Jump **662** | Alternate **664** |
| | Connect | |
| Row **554** | To | **584** Equal |
| Key Row **544** | To | **585** Equal |
| ON **579** | To | **571** Column Reset |
| Equal **586** | To | **662** Jump |
| Alternate **664** | To | **691** |
| Next **663** | To | **671** |

Table 7: Reset Column Test to Omit Key Row

| | | |
|---|---|---|
| | Control **670** | |
| | Start **671** | Next **673** |
| | Jump **672** | Alternate **674** |
| | Connect | |

| | | |
|---|---|---|
| Row 554 | To | 505 First Output Address |
| Key Column 564 | To | 502 First Output Address |
| Key Row 544 | To | 506 Second Output Address |
| Key Column 564 | To | 503 Second Output Address |
| First Output 508 | To | 536 First Input Divide |
| Second Output 509 | To | 537 Second Input Divide |
| Divide Output 538 | To | 515 Input Temporary Register |
| Next 673 | To | 681 |

Table 8: Set Up Multiplier for This Row

| | | |
|---|---|---|
| | Control 680 | |
| Start 681 | | Next 683 |
| Jump 682 | | Alternate 684 |
| | Connect | |
| Key Row 544 | To | 505 First Output Address |
| Column 574 | To | 502 First Output Address |
| Row 554 | To | 506 Second Output Address |
| Column 574 | To | 503 Second Output Address |
| First Output 508 | To | 523 First Input Multiply |
| Temporary Register Output 516 | To | 524 Second Input Multiply |
| Second Output 509 | To | 527 First Input Subtract |
| Multiply Output 525 | To | 528 Second Input Subtract |
| Row 554 | To | 507 First Input Address |
| Column 574 | To | 504 First Input Address |
| Subtract Output 529 | To | 510 First Input |
| ON 579 | To | 572 Increment Column |
| Column 574 | To | 588 First Input One More |
| Column Length 577 | To | 589 Second Input One More |
| One More Output 590 | To | 682 Jump |
| Next 683 | To | 681 Start (Loop Until Alternate Selected) |
| Alternate 684 | To | 691 |

Table 9: Multiply Key Row Element By the Multiplier Set Up In 670, Subtract This From the Current Element Value and Store the Result Back. Increment to the Next Column and Repeat Until the End of the Row

| | | |
|---|---|---|
| | Control 690 | |
| Start 691 | | Next 693 |
| Jump 692 | | Alternate 694 |
| | Connect | |
| Row 554 | To | 584 First Input Equal |
| Column Length 577 | To | 585 Second Input Equal |
| Equal Output 586 | To | 692 Jump |
| ON 579 | To | 552 Increment Row |
| Next 693 | To | 661 |
| Alternate 694 | To | 701 |

Table 10: Test for Last Row, Increment Row

| | | |
|---|---|---|
| | Control 700 | |
| Start 701 | | Next 703 |
| Jump 702 | | Alternate 704 |
| | Connect | |
| Key Row 544 | To | 584 Inputs Equal |
| Column Length 577 | To | 585 Inputs Equal |
| Equal Output 586 | To | 702 Jump |
| ON 579 | To | 542 Increment Key Row |
| ON 579 | To | 562 Increment Key Column |
| Next 703 | To | 611 |
| Alternate 704 | To | Out; End of Procedure, Elementary Symmetric Functions Found |

Table 11

| | | |
|---|---|---|
| | Control 710 | |
| Start 711 | | Next 713 |
| Jump 712 | | Alternate 714 |
| | Connect | |
| Key Row Output 544 | To | 553 Row Input |
| Next 713 | To | 721 |

Table 12: Set Row to the Value of Key Row

| | | |
|---|---|---|
| | Control 720 | |
| Start 721 | | Next 723 |
| Jump 722 | | Alternate 724 |
| | Connect | |
| Row 554 | To | 584 Inputs Equal |
| Column Length 577 | To | 585 Inputs Equal |
| Equal Output 586 | To | 722 Jump |
| ON 579 | To | 552 Increment Row |
| Next 723 | To | 731 |
| Alternate 724 | To | 741 |

Table 13: Test for Last Row. Increment Row

| | | |
|---|---|---|
| | Control 730 | |
| Start 731 | | Next 733 |
| Jump 732 | | Alternate 734 |
| | Connect | |
| Row 554 | To | 505 First Output Address |
| Key Column 564 | To | 502 First Output Address |
| First Output 508 | To | 581 Input Zero |
| Zero Output 582 | To | 732 Jump |
| ON 579 | To | 571 Reset Column |
| Next 733 | To | 751 |
| Alternate 734 | To | 721 |

Table 14: Look For Non-Zero Element

| | | |
|---|---|---|
| | Control 740 | |
| Start 741 | | Next 743 |
| Jump 742 | | Alternate 744 |
| | Connect | |
| Key Row 544 | To | 576 Column Length |
| Next 743 | To | Out; End of Procedure, Elementary Symmetric Functions Found |

Table 15: End Due to No More Non-Zero Elements

| | | |
|---|---|---|
| | Control 750 | |
| Start 751 | | Next 753 |
| Jump 752 | | Alternate 754 |
| | Connect | |
| Row 554 | To | 505 First Output Address |
| Column 574 | To | 502 First Output Address |
| Key Row 544 | To | 506 Second Output Address |
| Column 574 | To | 503 Second Output Address |
| Key Row 544 | To | 507 First Input Address |
| Column 574 | To | 504 First Input Address |
| Row 554 | To | 512 Second Input Address |
| Column 574 | To | 511 Second Input Address |
| First Output 508 | To | 510 First Input |
| Second Output 509 | To | 513 Second Input |
| Column 574 | To | 588 First Input One More |
| Column Length 577 | To | 589 Second Input One More |
| One More Output 590 | To | 752 Jump |
| ON 579 | To | 562 Increment Column |
| Next 753 | To | 751 Next Element In the Row |
| Alternate 754 | To | 621 End of Row |

Table 16: Exchange Row Having Non-Zero Element With The Key Row

In all logical connections specified in the above tables, adequate timing is provided so that for each element the output shall not change until the inputs are ready, and the new input will not produce an output until subsequent connections have been made. It will be recalled from the explanation of the structure of the error correction decoder that one of its functions is to compute the non-trivial elementary symmetric functions. After the computing process is complete, the result is contained in the first $L$ rows of column $L+1$, where $L$ is the final value of the column length register. The basic operation, with respect to the matrix storage memory 501, is that when an address is applied to a column address and to the corresponding row address, the element address will be sent out on the corresponding output bus or accepted on the corresponding input bus. The inputs will be accepted after a brief delay to allow the outputs to accept other logic elements in the sequence of connection. The cyclic sequence is:

1. Set up logical and address connections.
2. Access output values from matrix storage memory memory 501.
3. Allow the logic to settle.
4. Determine if the jump input (see subsequent tables) is on.
5. Store input values to the matrix storage memory 501.
6. Increment the address registers as specified.
7. Go to the next control connection.

An example of operation for a particular control connection is seen in Table 1. The starting point is labeled 601; 602 is the jump point. The NEXT instruction is labeled 603, while the ALTERNATE next instruction is 604. In general the subsequent control connection block from a given block is either NEXT or ALTERNATE. If a logical on appears on the JUMP line of a given block, then the subsequent block is given by ALTERNATE; otherwise it is given by NEXT. The first operation in control block 600 is to connect the output 579 of the on trigger 578 to line 541 which is the reset to the key row address register 540. Concurrently, output 579 of ON trigger 578 is connected to line 561 which is the reset line of the key column register 560. These two connections reset the key row and key column registers. The next operation is the step labeled Next, 603, which provides for the operation to switch to control point 611. This is the start point of control point 610 of Table 2. The first operation in Table 2 is to connect output 544 of key row address register 540 to line 505, which is the first output row address selected in matrix storage memory 501. Logical connections in the control logic 599 continue in this manner until the non-trivial elementary symmetric functions are computed. This will be made more clear in a detailed example of the operation of the decoder to be given subsequently.

Example of Error Correction

An example of error correction will now be given. The example will first be given mathematically, and will then be explained with reference to the apparatus of the invention. The binary values of the elements $\alpha^m$ can be seen from Table C for use in the example.

Assume: Doing three error corrections

Assume: There are two errors:

1. The last bit in the next to last character
2. All bits in the last character

These errors have the following error magnitudes:

$$Y_1 = 000001 = \alpha^0$$
$$Y_2 = 111111 = \alpha^{58}$$

The values of $\alpha^m$ can be seen in Table C below:

TABLE C

| | | | | | | | |
|---|---|---|---|---|---|---|---|
| $\alpha^0$ | = | 000001 | $\alpha^{32}$ | = | 001001 | | |
| $\alpha^1$ | = | 000010 | $\alpha^{33}$ | = | 010010 | | |
| $\alpha^2$ | = | 000100 | $\alpha^{34}$ | = | 100100 | | |
| $\alpha^3$ | = | 001000 | $\alpha^{35}$ | = | 001011 | | |
| $\alpha^4$ | = | 010000 | $\alpha^{36}$ | = | 010110 | | |
| $\alpha^5$ | = | 100000 | $\alpha^{37}$ | = | 101100 | | |
| $\alpha^6$ | = | 000011 | $\alpha^{38}$ | = | 011011 | | |
| $\alpha^7$ | = | 000110 | $\alpha^{39}$ | = | 110110 | | |
| $\alpha^8$ | = | 001100 | $\alpha^{40}$ | = | 101111 | | |
| $\alpha^9$ | = | 011000 | $\alpha^{41}$ | = | 011101 | | |
| $\alpha^{10}$ | = | 110000 | $\alpha^{42}$ | = | 111010 | | |
| $\alpha^{11}$ | = | 100011 | $\alpha^{43}$ | = | 110111 | | |
| $\alpha^{12}$ | = | 000101 | $\alpha^{44}$ | = | 101101 | | |
| $\alpha^{13}$ | = | 001010 | $\alpha^{45}$ | = | 011001 | | |
| $\alpha^{14}$ | = | 010100 | $\alpha^{46}$ | = | 110010 | | |
| $\alpha^{15}$ | = | 101000 | $\alpha^{47}$ | = | 100111 | | |
| $\alpha^{16}$ | = | 010011 | $\alpha^{48}$ | = | 001101 | | |
| $\alpha^{17}$ | = | 100110 | $\alpha^{49}$ | = | 011010 | | |
| $\alpha^{18}$ | = | 001111 | $\alpha^{50}$ | = | 110100 | | |
| $\alpha^{19}$ | = | 011110 | $\alpha^{51}$ | = | 101011 | | |
| $\alpha^{20}$ | = | 111100 | $\alpha^{52}$ | = | 010101 | | |
| $\alpha^{21}$ | = | 111011 | $\alpha^{53}$ | = | 101010 | | |
| $\alpha^{22}$ | = | 110101 | $\alpha^{54}$ | = | 010111 | | |
| $\alpha^{23}$ | = | 101001 | $\alpha^{55}$ | = | 101110 | | |
| $\alpha^{24}$ | = | 010001 | $\alpha^{56}$ | = | 011111 | | |
| $\alpha^{25}$ | = | 100010 | $\alpha^{57}$ | = | 111110 | | |
| $\alpha^{26}$ | = | 000111 | $\alpha^{58}$ | = | 111111 | $=\alpha^{-5}$ | Powers of $\alpha$ |
| $\alpha^{27}$ | = | 001110 | $\alpha^{59}$ | = | 111101 | $=\alpha^{-4}$ | |
| $\alpha^{28}$ | = | 011100 | $\alpha^{60}$ | = | 111001 | $=\alpha^{-3}$ | |
| $\alpha^{29}$ | = | 111000 | $\alpha^{61}$ | = | 110001 | $=\alpha^{-2}$ | |
| $\alpha^{30}$ | = | 110011 | $\alpha^{62}$ | = | 100001 | $=\alpha^{-1}$ | |
| $\alpha^{31}$ | = | 100101 | $\alpha^{63}$ | = | 000001 | $=\alpha^{0}$ | |

The error locations (from the data end of the line) are given by the logarithms to the base $\alpha$ (where $\alpha$ is a primitive element of the Galois Field of 63 elements). They are:

$$\log X_1 = 1$$
$$\log X_2 = 0$$

or:

$$X_1 = \alpha^1 = 000010$$
$$X_2 = \alpha^0 = 000001$$

where the generating polynomial for the Galois field is $x^6 + x + 1$.

Of course, when the actual solution is begun, the error magnitudes and locations are not known but will be found in the course of the solution.

This example illustrates the error correction decoding procedure.

1. The first step is the solution for the error sums in error sum calculating registers. This step corresponds exactly to the step 1 given on page 173 of Peterson, *Error-Correcting Codes*, (MIT Press, 1961).

The error sums (also called power sums or syndromes) are:

$S_{-5} = X_1^{-5}Y_1 + X_2^{-5}Y_2 = \alpha^{-5}\alpha^0 + \alpha^0\alpha^{58} = \alpha^{-5} + \alpha^{58} =$ 000000

$S_{-4} = X_1^{-4}Y_1 + X_2^{-4}Y_2 = \alpha^{-4}\alpha^0 + \alpha^0\alpha^{58} = \alpha^{-4} + \alpha^{58} =$ 000010

| | |
|---|---|
| $S_{-3}$ = etc. | 000110 |
| $S_{-2}$ = etc. | 001110 |
| $S_{-1}$ = etc. | 011110 |
| $S_0$ = etc. | 111110 |
| $S_1$ = etc. | 111101 |
| $S_2$ = etc. | 111011 |
| $S_3$ = etc. | 110111 |
| $S_4$ = etc. | 101111 |
| $S_5$ = etc. | 011111 |

2. Step 2 given by Peterson is omitted. This is an important saving made possible by the apparatus of FIG. 9 as it performs step 3 of the process.

3. The matrix to be solved in step three is:

| | | | |
|---|---|---|---|
| $S_{-5}$ | $S_{-4}$ | $S_{-3}$ | $S_{-2}$ |
| $S_{-4}$ | $S_{-3}$ | $S_{-2}$ | $S_{-1}$ |
| $S_{-3}$ | $S_{-2}$ | $S_{-1}$ | $S_{-0}$ |

| | | | |
|---|---|---|---|
| 000000 | 000010 | 000110 | 001110 |
| 000010 | 000110 | 001110 | 011110 |
| 000110 | 001110 | 011110 | 111110 |

Initially the first row is selected as the key row, and the first column is selected as the key column making the upper left hand element the key element.

To start the process, a test is made to see if the first element is zero. It is, so the process looks for a non-zero element below the key element. It finds one in the first element of the second row. This is the first non-zero element below the key element. To get this non-zero element into the key position, the first two rows are exchanged to produce:

| | | | |
|---|---|---|---|
| 000010 | 000110 | 001110 | 011110 |
| 000000 | 000010 | 000110 | 001110 |
| 000110 | 001110 | 011110 | 111110 |

Now the key element is non zero, all the elements in the key row except the key element are divided by the key element after the key element itself is divided by itself (producing $\alpha^0$). The result is:

| | | | |
|---|---|---|---|
| 000001 | 000011 | 000111 | 001111 |
| 000000 | 000010 | 000110 | 001110 |
| 000110 | 001110 | 011110 | 111110 |

Now the first element in the key column (excluding the key element) is divided by the key element ($\alpha^0$) to get a multiplier. This multiplier is 0 in the case of the second row. The second row is modified by subtracting the product of this multiplier times the key row from the second row. After this is completed, the third row is treated similarly producing:

| | | | |
|---|---|---|---|
| 000001 | 000011 | 000111 | 001111 |
| 000000 | 000010 | 000110 | 001110 |
| 000000 | 000100 | 001100 | 011100 |
| 000001 | 000011 | 000111 | 001111 |
| 000000 | 000001 | 000011 | 000111 |
| 000000 | 000100 | 001100 | 011100 |

Now the elements above and below the key element are used to find multipliers which are used to modify the rows as before to produce:

| | | | |
|---|---|---|---|
| 000001 | 000000 | 000010 | 000110 |
| 000000 | 000001 | 000011 | 000111 |
| 000000 | 000000 | 000000 | 000000 |

Now the key row and key column are incremented to three. This new key element is zero and there are no non-zero elements below it to exchange with so the matrix of three rows and four columns cannot be solved. Note, however, that the 2 × 3 matrix in the box is the solution that would have been obtained, if initially two elementary symmetric functions had been sought. This is our answer. The elementary symmetric functions are:

$$\sigma_2 = 000010$$
$$\sigma_1 = 000011$$

4. Step four is the solution for the error location numbers which are the roots of the equation:

$$x^2 - \sigma_1 X + \sigma_2 = 0$$
$$X^2 - \alpha^6 X + \alpha^1 = 0$$

In this example the equation is a quadratic and can be solved directly. If the equation were greater than a quadratic, a root would be sought by trial-and-error, and the line factor $(X - X_i)$ (where $X_i$ is the root found) would be divided out and the process continued until a quadratic is obtained which can be used in the direct solution process.

If there are more errors than the number being sought, there will, of course, often be no solution for this step.

In this case the solution is:

$$X_1 = \alpha^1$$
$$X_0 = \alpha^0$$

Inasmuch as $$(X - X_1)(X - X_0) = X^2 - \alpha^6 X + \alpha^1.$$

5. The values of Y are found as specified by Peterson:

$$Y_1 = \alpha^0$$
$$Y_2 = \alpha^{58}$$

OPERATION OF ERROR CORRECTION DECODER

The method of obtaining the elementary symmetric functions will now be given with respect to the error correction decoder of FIG. 9.

Before starting the process of finding the elementary symmetric function, we load the number of errors which we are seeking into register 575 which is the column length to start the process. The matrix storage 501 is loaded beginning at the upper left-hand matrix location with the values $S_i$. The location to the right of the upper right-hand corner location and the location just below it are loaded with $S_{i+1}$. The next subsequent locations to the right and beneath are loaded with $S_{i+2}$ etc. until the entire matrix has been filled. The process starts with 600 of Table 1 in which registers 540 and 560 of FIG. 9 are reset to 1. Resetting the key row address and the key column address to 1, we choose as our initial key element the upper left-hand element in the matrix. The next control step is 610 of Table 2. In this block we test to see if the key element is equal to 0 with zero test 580. If it is not, we proceed to 620 of Table 3. If it is equal to 0, we go to our alternate next control which is 710 of Table 12. In the example at hand, we have a zero value and go to block 710. In connection 710, the row address is set equal to the key row address. The next step is connection 720, Table 13. In connection 720 we test to see if the row address is the address of the last row. The other thing we do is to increment the row address after having made this test. If it is the last row then we go to our alternate output which is connection 740 of Table 15. If it is not the last row, we go to connection 730, Table 14. In 730 we look to see if the element which is directly below the key element is non-zero. If it is zero, we go to our alternate next step which is 720. If it is non-zero, we go to 750, Table 16. In the case that it was zero, we are returning back to 720 which we just came from which will cause us to increment to the next row and continue looking for a non-zero value. If we go to 750 we will also reset the column address. In 750 we exchange the first element in the key row with the first element in the row which we are now considering and have found a non-zero element below the key element *n*. If we have come to the last element in the row, we go to 620 of Table 3 as the next step which returns us to the main part of the program. If we have not completed the row, we repeat 750 until the row has been completed. It will be recalled that there was an alternate exit from step 720 which took us to step 740. In the case that we go to 740, which would mean that there is no further non-zero element below the key element, which would terminate our entire procedure. That was not the case at this time in the example, however. In block 620, the value of the column address register 570 is reset to 1. Our next block is 630 of Table 4. In block 630, we test to see if the column address register has the same value as the key column address register. If it does, we increment the column address register, thereby omitting the key column from our present procedure. The next block is block 640 of Table 5. In this block we take as our first output from the matrix the element which is addressed by the key row address register 540 and the column address register 570. This is one of the elements in the key row, but not the key element which we specifically omitted. We then take as our second output the key element itself addressed by the key row address register 540 and key column register 560. This first output is divided by the second output, that is to say, an element in the key row is divided by the key element. The result is stored back in the location where the element, other than the key element, was taken from. We test for incrementing the column to see if the column we are now dealing with is one more in value than the length of the column. If it were, we would be working on the last column, because there is, in fact, one more column than there are rows. If we are working on the last column and have just completed treating all the elements in the key row, with the exception of the key element itself, we will leave from the alternate exit 643 of Table 5 which takes us to block 650 of Table 6. If we have not completed the row, we will proceed to control step block 630 of Table 4 which is a loop which will continue testing to make sure that we omit the key element and proceed to divide each of the elements in the key row by the key element until we reach the end of the row where we will leave to block 650 of Table 6. In block 650 we divide the key element by itself. This was the one element that we omitted in block 640. We do this division by the simple expediency of knowing the answer which is always 1. Therefore, we store 1 in the position of the key element. At this point we have now divided all of the elements in the key row by the key element, and we are ready to proceed to block 660 of Table 7. The other function of block 650 is to reset the row address register to 1 so that we will start our following procedures with a first row. In block 660 we test to see if the row address register 650 is equal to the key row address register 540. If it is, we will go to our alternate next step which is block 690 of Table 10. This will cause us to omit the key row. If not equal, we will begin work on a particular row which is not the key row. To do this in Table 7, we will go to our next block which is block 670 of Table 8. Another function which occurs in block 660 is to reset the column. At this time, it happens that our row and our key row are both one. Thus, we will leave to our alternate next block, block 690 of Table 10. In block 690 we test to see if the row address register 550 is equal to the column length register 575. If it is, we have completed the last row. In this case we will go to an alternate next block 700 of Table 11. However, if this is not the last row we will increment the row counter and go to block 660 of Table 7, which is the block we just came from. Thus, this step merely increments us to the next row, checks to make sure we have not completed the operation, or provides us with an exit if we have. It allows us to look at each of the rows except the key row. Back at block 660 again, we will again reset the column address register 570 which was already reset anyway; and now the row will not be equal to the key row because we have incremented the row to the second row. So we will leave to our next block, block 680 of Table 8. In block 670 we will set up in the temporary register 514 a multiplier which we will obtain by dividing the element which is below or above, as the case may be, the key element that is in the row that we are now looking at by the key element itself. The next step is block 680 of Table 9. Block 680 takes the output that corresponds to the current column being addressed in the key row and multiplies it by the multiplier that is in the temporary register 514. This is then subtracted from the element which we obtained from the row address register 550 and column register 570. The result is stored back in the location given by the row address register 550 and the column address register 570. This means that one of the elements in the current row of interest is modified by taking the corresponding elements in the same column but in the key row, multiplying that element from the key row by a fixed multiplier and subtracting that result from the element in the row that we are now looking at. If the column address is one more that the column length, we come to the end of the row and we will go to our alternate output of block 690 of Table 10. If we have not come to the end of the row, then we will go to our next block which, in this case, happens to be the same block that we are in now, block 680; and we will repeat the same operation. HOwever, we will increment the column address register 570 so that we will proceed to the next column. Finally, when we have completed the row we go to our alternate exit which takes us to block 690, Table 10. Block 690 tests to see if the row is equal to the column length, that is to see if we are finished with the last row. If we have finished with the last row, we will go to our alternate output which is block 700, Table 11. Otherwise, we will increment the next row and go to block 660, Table 7 which, if you recall, tested to make sure that this was not the key row and continued with the same process that we were working on in the steps 670 and 680, omitting the key row as required by returning to block 690 from block 660 which, of course, in turn returns back to block 660 to proceed with the operations. Finally, when this process is completed, we go to step 700, Table 11. At this point we test to see if the key row address is equal in value to the column length. If it is, we have finished with the last key row. The process is completed. We exit out of our alternate exit which does not go anywhere particularly. It means that we have found the elementary symmetric functions and that they are located in the column whose address is one more than the column length. If this is not the last key row, that is to say the key row address register is not equal to the column length register, then the key row is incremented by 1, the key column is incremented by 1; and we proceed to our next block, which is block 610. This takes us back to the beginning of the procedure to work on the next key row and the process continues until we have finished the last key row.

Error Location Number Determining Apparatus

Figure 10:
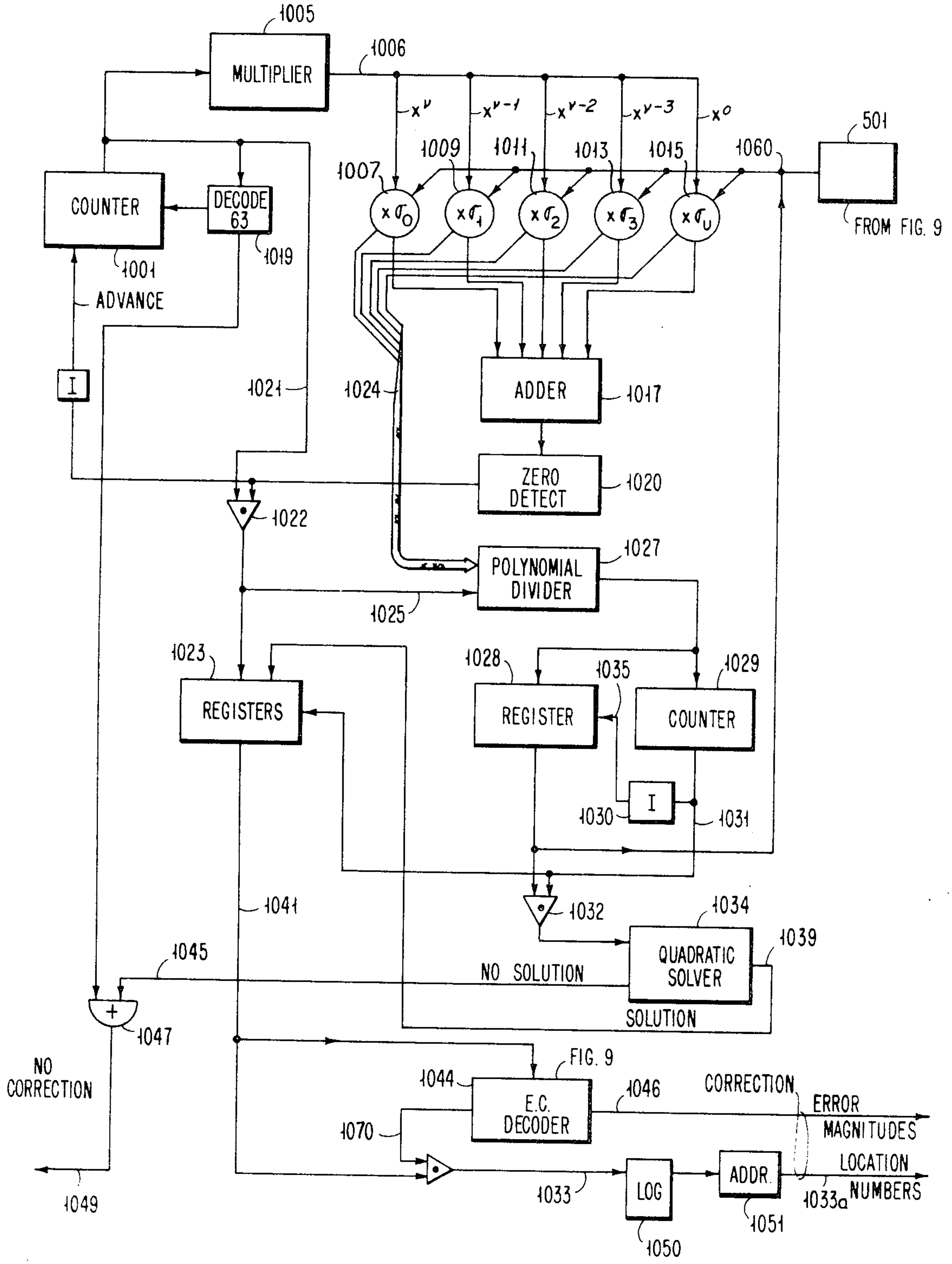
FIG. 10 is a representation of apparatus used in our invention to determine error location numbers and error magnitudes when multiple error correction is being performed.

Referring now to FIG. 10 there is shown apparatus for determining the error location numbers and error magnitudes when multiple error correction is being performed. It will be appreciated that for single error correction the error location number and error magnitude were obtained directly as shown in FIG. 8A-A. With reference to FIG. 10 counter 1001 is connected to multiplier 1005 and to decode 1019 which decodes the number 63. The output of decode 1019 serves to reset the counter and advance it to its first count position. In this apparatus in FIG. 10 we have reached the situation where the error correction decoder of FIG. 9 has determined the nontrivial elementary symmetric functions $\alpha_i$. In order to determine the error location numbers and, subsequently, the error magnitudes, it is necessary to find all the values of $X$ (the values of the elements of the Galois field $[2^6]$) which force the function $$\sum_{i=0}^{\nu} \sigma_i X^{\nu-i}$$

to be equal to zero where $\nu$ is the number of actual errors, provided that the number of actual errors does not exceed the number of errors which were being sought (e.g. the number inserted in the column length register at the beginning of the process for finding the elementary symmetrical functions.) An attempt will be made to reduce this function to a quadratic. This is essentially a trial-and-error process; therefore, the counter 1001 is stepped 63 times for all elements, exclusive of the all-zeroes element. Multiplier 1005 raises X to the decreasing powers of $\nu$, so that for each $X$ tried $X^{\nu}$, $X^{\nu-1}$, –,$X^0$ will be the values set into the multipliers 1007, 1009, 1011, 1013 and 1015. Matrix storage memory 501, previously seen in FIG. 9, is connected via Bus 1060 to each of the above-mentioned multipliers. For the initial attempt at reduction, the valves of $\sigma_i$ will be set into the various multipliers from matrix 501. Each multiplier is connected to adder circuit 1017 which, in turn, is connected to zero detection circuit 1020. The output of zero detection circuit 1020 is connected as one enabling input to AND facility 1022, the other enabling input being line 1021 from the output of the counter. The $\sigma$'s from each of the above multipliers are also connected via Bus 1024 to the input of polynomial divider 1027. Bus 1025 connects the output of AND facility 1022 to the input of polynomial divider 1027. Polynomial divider 1027 is well-known to those skilled in the art. An example of such can be found in the book, *Error Correcting Codes*, by W. W. Peterson, M.I.T. Press, 1965, FIG. 7.6, page 111. The input to the polynomial divider over bus 1024 is the polynomial from the multipliers while the divisor is the input over bus 1025 which is the polynomial $X - X_1$, where $X_1$ is the particular value of $X$, which allows the above function to go to zero. The output of the polynomial divider is a reduced polynomial, that is, a polynomial which is reduced by one power after each pass through the polynomial divider. This reduced polynomial will ultimately be set back into the multipliers, 1009 – 1015 over Bus 1037 each time a $X$ is found which forces the above function to go to zero. The output of polynomial divider 1027 is connected to register 1028 and to counter 1029. The function of counter 1029 is to count the number of output pulses from the polynomial divider 1027. If the count is 3, it indicates that the polynomial has been reduced to a quadratic, which is one of the goals of the apparatus. Line 1031 is the output which is activated if the count is 3; and this output is connected as an enabling input to AND facility 1032, which has as its other input the contents of register 1028 which was the stored output of polynomial divider 1027. The output of AND facility 1032 is connected as an input to quadratic solver 1034. Line 1031 is also connected to inverter 1030, the output of which is connected as a gating input to register 1028. The output of decoder 1019 indicates that the counter has been stepped through all values of $X$. If this is the case, it means that all values of $X$ have been tried and the polynomial expression has not been reduced to a quadratic. In this case no correction is possible for the number of corrections assumed, and a signal is produced on line 1049, the output of OR gate 1047. This output indicates that no correction is possible. It will be recalled with reference back to FIG. 8B-B that a signal on this line (for 3–EC) activates OR gate 864 to activate the error line. The error line is seen also on FIG. 8A as an input to OR gate 323, having output 318 which serves to increment binary counter 300 to select the next try in the particular EDC schedule which is operative. Referring back to FIG. 10, line 1031 from counter 1029 conditions AND facility 1032 to gate the output of register 1028 to quadratic 1034. If the quadratic is solvable, then the solution is given on bus 1039. The two solutions to the quadratic will be two of the error location numbers. If there were more than two errors, the other location numbers would be the values of $X$ which force the polynomial to 0. These are stored in register 1023. Bus 1039 also stores the two quadratic solutions in register 1023. Output 1041 of register 1023 is connected to error correction decoder 1044. It will be recalled that the error correction decoder was described in detail in FIG. 9. For that description, the operation of the decoder was shown for the situation in which the non-trivial elementary symmetric function $\sigma_t$ were determined by operation on a matrix of the form:

$$\begin{matrix} S_l & S_{l-1} & S_{l-2} & \cdots \\ S_{l-1} & S_{l-2} & S_{l-3} & \\ S_{l-2} & S_{l-3} & S_{l-4} & \\ \cdot & & & \\ \cdot & & & \\ \cdot & & & \end{matrix}$$

In the present situation for multiple error correction, the values of $X$ which force the polynomial to zero and also the two solutions of the ultimate quadratic polynomial are the error location numbers $X_l$. These location numbers will then be loaded into matrix storage memory 501 in the form shown below for three error correction 2nd Matrix $$\begin{matrix} X_1 & X_2 & X_3 & S_1 \\ X_1^2 & X_2^2 & X_3^2 & S_2 \\ X_1^3 & X_2^3 & X_3^3 & S_3 \end{matrix}$$

where $S_l$ are the particular power sums obtainable from the power sum calculators of FIGS. 6A. OPeration of the decoder of FIG. 9 proceeds precisely as was given for the above example when solving for the elementary symmetric functions. The solution of the above matrix in the decoder of FIG. 9 will yield the error magnitudes $Y_1$ $Y_2$–$Y_n$ such as those in the above-numerical example on bus 1046. When the solution is determined, line 1070 will gate the error location numbers which were stored in registers 1023 out through line 1033. In block 1050 the logarithms to base $\alpha$ of the error location numbers are found by table look-up, for example. This output goes to an address look-up process 1051 which obtains the corresponding buffer addresses. Bus 1046 will contain the error magnitudes and bus 1033a will contain the buffer addresses of the errors. Both these busses together will indicate the attempted correction. It will be recalled from FIG. 8A that these correction busses were those shown as inputs to OR gate 70, the output of which was bus 35 to the data buffer of FIG. 1. It will be recalled that the present generalized Reed-Solomon code used will correct up to 5 errors. When beginning the error correction process by determining the non-trivial elementary symmetric functions, the number of errors assumed (the original number set into column length register 575 of FIG. 9) can be any number between 2 and 5, according to the EDC Scheduler in operation. There may in fact be more errors than the number assumed in a given schedule. Nevertheless the process may come up with solutions to the error locations and magnitudes with which to try a correction in the buffer. This is the reason there arises the necessity to always recheck the repaired line after an attempted correction, as was described relative to FIG. 8B-B, for example.

While the invention has been particularly shown and described with reference to a preferred embodiment thereof, it will be understood by those skilled in the art that various changes in form and details may be made therein without departing from the spirit and scope of the invention.

What is claimed is:

1. In an error detection and correction system, the combination of:

means for encoding data blocks by adding redundancy according to a non-random code, each said data block having an identifier near the end thereof;

means for decoding said encoded data blocks and providing an indication of any error detected therein;.

2. The combination of claim 1 wherein said indication comprises a component contributed by an error in said identifier and a component contributed by an error syndrome generated by said code.

3. In an error detection and correction system, the combination of:

means for encoding characters with a non-random code to form an encoded data block comprising characters having a number of bits, said encoding means including means for inverting at least one bit of said encoded data block;

means for checking errors in said encoded data block; and, means for re-inverting said at least one inverted bit prior to the operation of said error checking means on said at least one inverted bit.

4. The combination of claim 3 wherein the number of bits inverted encoder is equal to at least $N/2$ where $N$ is a number greater than the maximum error correction capability of said code.

5. The combination of claim 3 wherein said inverted bits are in the redundancy added according to said code.

6. The method of providing error correction of data comprising the steps of:

a. encoding characters of information to form an encoded information block having redundancy, by using a generator polynomial having $\alpha^0$ as a factor thereof, where $\alpha^0$ is the identity element of the Galois Field of $q^M$ elements; and b. decoding said encoded information block by forming check sums such that the magnitude of the error for single error correction is obtained directly as one of said check sums.

7. In a data error detection and correction system, a data encoder comprising shift register means having as components thereof symmetrical multiplication means, each of which is connected to modulo-two adders in said shift register, for encoding information blocks in a generalized Reed-Solomon code having $\alpha^0$ as a factor of its generator polynomial.

8. The method of recording a pattern $\bar{X}^n X \bar{X}^{(n-1)} X - X \bar{X}^2 X \bar{X}^1 X$ where $\bar{X}$ is the logical complement of $X$, and $n$ is the number of times $\bar{X}$ is repeated, including the steps of:

decoding n sequences of clock pulses, each of said sequences being of length $j$, where $j$ successively varies from n to $[(n+1)-(n-1)]$; and recording for each sequence decoded, a number of bits of a first logical state followed by a single bit of the complement logical state to said first logical state, said number of bits of said first logical state being of length equal to one less than the length of said decoded sequence.

9. In a data error detection and correction system, wherein data is encoded in a non-random code, the combination of:

a plurality of power sum calculating means for computing a residue from encoded data;

means for determining the error magnitude and error location for single error correction, said last-named means including apparatus for performing Galois Field arithmetic to obtain the error location, and means for obtaining the error magnitude as the direct output of one of said power sum calculators.

10. The combination of claim 9 wherein said apparatus for performing Galois Field arithmetic includes:

means for determining the logarithm to the base $\alpha$ of specified power sums;

means for providing an output indicative of the difference modulo $q^M$ between said logarithms where $q^M$ is the number of elements in said Galois Field and $\alpha$ is the primitive element of said field; and means for translating said output to a physical storage address which contains said single error.

11. In a data error detection and correction system wherein data is encoded according to a non-random code and decoded to obtain a residue from said encoded data, the combination of:

decoding means for obtaining elementary symmetric functions from particular components of said residue;

detection means for determining the elements of the Galois Field of $q^{V}$ elements which force to zero the function $$\sum_{i=0}^{\nu} \sigma_i X^{\nu-i}$$

where $\nu$ is the number of elementary symmetric functions,
$\sigma_i$ are the elementary symmetric functions,
$X$ are elements of the Galois Field $q^{V}$, and
$\nu-i$ is greater than 2 polynomial divider means for reducing the polynomial $$\sum_{i=0}^{\nu} \sigma_i X^{\nu-i}$$

by each of said elements of said Galois Field;

means for detecting that said polynomial has been reduced to a quadratic function;

means for solving said quadratic function and providing an indication that solutions have been reached or that no solutions are possible;

means for storing said solutions and said elements.

12. The combination of claim 11 further including decoding means for accepting said solutions and said elements and providing error magnitudes; and means for providing error location numbers from said solutions and said elements.

13. The combination of claim 12 further including detection means for providing an indication that there are insufficient elements in said Galois Field to reduce said polynomial to a quadratic; and gating means for supplying said last-named indication or said indication of no solution as a signal indicative of the fact that error correction is not possible.

14. In a data error detection and correction system wherein data is encoded in a non-random code, the process of determining error magnitudes and error locations including the steps of:

1. performing a parity check operation to determine an error syndrome;
2. actuating control connections in a decoder to segregate $\nu$ sets of first signals from combinations of components of said error syndrome, said $\nu$ sets of first signals representative of elementary symmetric functions $\sigma_i$, and $\nu$ being a selected integral value less than or equal to the maximum number of errors correctable by said code;
3. actuating apparatus for determining each of the non-zero elements of the Galois Field of $q^{V}$ elements which force the polynomial $$\sum_{i=0}^{\nu} \sigma i X^{\sigma-1}$$

to be zero; and 4. actuating control connections in a decoder to segregate $\nu$ sets of second signals from a combination of components of said error syndrome and said non-zero elements of step (3), said $\nu$ sets of second signals indicative of error magnitudes.

* * * * *